(12) United States Patent
Poland et al.

(10) Patent No.: US 12,353,175 B2
(45) Date of Patent: Jul. 8, 2025

(54) METHOD AND COMPUTER SYSTEM FOR GENERATING A DECISION LOGIC FOR A CONTROLLER

(71) Applicant: Hitachi Energy Ltd, Zürich (CH)

(72) Inventors: Jan Poland, Nussbaumen (CH); Adamantios Marinakis, Fislisbach (CH); Ioannis Lymperopoulos, Dietikon (CH); Yaman Cansin Evrenosoglu, Baden (CH); Pawel Dawidowski, Malopolskie (PL); Sinisa Zubic, Vasteras (SE)

(73) Assignee: Hitachi Energy Ltd, Zurich (CH)

( * ) Notice: Subject to any disclaimer, the term of this patent is extended or adjusted under 35 U.S.C. 154(b) by 878 days.

(21) Appl. No.: 17/405,660

(22) Filed: Aug. 18, 2021

(65) Prior Publication Data
US 2022/0057759 A1    Feb. 24, 2022

(30) Foreign Application Priority Data
Aug. 19, 2020 (EP) .................................. 20191650

(51) Int. Cl.
G05B 13/02 (2006.01)
(52) U.S. Cl.
CPC .................................. G05B 13/027 (2013.01)
(58) Field of Classification Search
CPC .................................................. G05B 13/027
USPC ........................................................ 700/22
See application file for complete search history.

(56) References Cited

U.S. PATENT DOCUMENTS

| | | | |
|---|---|---|---|
| 2009/0204267 A1 | 8/2009 | Sustaeta et al. | |
| 2012/0323558 A1* | 12/2012 | Nolan | G06N 7/01 |
| | | | 704/E11.001 |
| 2015/0127590 A1* | 5/2015 | Gay | G06N 20/00 |
| | | | 706/12 |
| 2016/0219071 A1 | 7/2016 | Vasseur et al. | |
| 2017/0093160 A1* | 3/2017 | Bell | G05F 1/66 |

(Continued)

FOREIGN PATENT DOCUMENTS

| | | | |
|---|---|---|---|
| CN | 110417351 A | * | 11/2019 |
| CN | 111144554 A | | 5/2020 |

(Continued)

OTHER PUBLICATIONS

Extended European Search Report for corresponding EP Application No. 20191650.9 dated Jan. 25, 2021, 8 pages.

(Continued)

*Primary Examiner* — Jigneshkumar C Patel
(74) *Attorney, Agent, or Firm* — Procopio, Cory, Hargreaves & Savitch LLP

(57) ABSTRACT

Machine learning, ML, using labeled data is performed to thereby train a ML model to generate decision logic for a controller of an IACS, in particular a power system controller. The ML model has ML model inputs and ML model outputs. The ML model is decomposed into a plurality of computational sub-processes, wherein intermediate signals output by one of the computational sub-processes are input into a consecutive one of the computational sub-processes. Information on the trained ML model is generated based on the intermediate signals and is output for interpretation, verification, visualization, and/or inspection of at least one of the computational sub-processes.

18 Claims, 18 Drawing Sheets

(56) References Cited

U.S. PATENT DOCUMENTS

| | | | |
|---|---|---|---|
| 2018/0245809 A1* | 8/2018 | Endel | F24F 11/30 |
| 2019/0221313 A1* | 7/2019 | Rim | G06F 18/217 |
| 2020/0012500 A1* | 1/2020 | Kern | G06F 9/445 |
| 2020/0119556 A1 | 4/2020 | Shi et al. | |
| 2020/0250076 A1* | 8/2020 | Yu | G06F 11/3676 |
| 2020/0292608 A1* | 9/2020 | Yan | G06N 3/044 |
| 2023/0062725 A1* | 3/2023 | Pal | H02J 13/0004 |

FOREIGN PATENT DOCUMENTS

| | | |
|---|---|---|
| JP | H6-165387 A | 6/1994 |
| JP | H7-322473 A | 12/1995 |
| JP | 2017-194782 A | 10/2017 |
| JP | 2019-179400 A | 10/2019 |

OTHER PUBLICATIONS

Pytorch, Achieving the Visualization of Middle Layers of Neural Networks, Jun. 20, 2020, https://blog.csdn. net, 5 pages.

Alain et al., "Understanding intermediate layers using linear classifier probes", Oct. 5, 2016, 30th Conference on Neural Information Processing Systems (NIPS 2016), Barcelona, Spain, 9 pages.

\* cited by examiner

METHOD AND COMPUTER SYSTEM FOR GENERATING A DECISION LOGIC FOR A CONTROLLER

FIELD OF THE INVENTION

The invention relates to methods and devices for generating a decision logic of a controller of an industrial automation control system (IACS), in particular a power transmission or distribution system or power generation system. More specifically, the invention relates to the use of machine learning for generating the decision logic.

BACKGROUND OF THE INVENTION

Modern industrial automation control systems (IACS), such as power generation systems or power transmission systems, power grids, or substations, and modern industrial systems include a vast number of components. The decision logic of protection devices such as protection relays of such systems decides which one of various actions is to be taken under which circumstances.

For illustration, in real-time operation of an electric power utility, transmission and distribution system equipment, including transformers, overhead lines, underground cables, series/shunt elements etc. are protected by means of a measurement system (voltages, currents), digital relay, and a circuit breaker. The control logic which is deployed in a digital relay utilizes the measured signals, identifies whether there is a severe fault which should be cleared to avoid damage to system equipment and finally sends a signal to the circuit breaker to open. Fast identification and clearance of faults are essential for the reliability and the security of the overall system.

The decision-making logic (i.e. protection logic) for each relay as well as the coordination scheme between multiple relays are designed and tested under anticipated grid scenarios. Conventionally, this is done by human expert engineers. During the design phase, engineers perform simulations of faults and other disturbances such as switching events in a grid to evaluate and refine the performance of the protection control-logic. The performance metrics are usually set by the prevailing practices for a given grid. Once deployed, the protection logic remains unchanged, until errors in its performance are observed.

Due to proliferation of converter-interfaced generation which introduces more stochasticity to the electricity supply temporally and spatially replacing the conventional generators, and e-mobility which introduces more stochasticity to demand, designing of protection systems are increasingly challenging as the grid operates closer to its limit. In addition, due to the lack of short circuit current capacities and different nature of short circuit currents (e.g. delayed zero crossings, distorted signals etc.) provided by the converter-interfaced generators as well as the multi-directional currents due to changing spatial patterns of generation, it is desirable for the protection systems to adjust to changing environments.

As a result, the development of protection logic becomes an increasingly complex task. Furthermore, this task will need to be performed increasingly often as the suitability of the protection system will require to be reevaluated more frequently due to changes in grid infrastructure as well as generation/demand patterns.

A conventional practice for protection logic design is such that, for each specific design case, an expert engineer selects among a plurality of protection functions (such as overcurrent, directional, distance, differential protection) or a combination of them and determines the settings (i.e. function parameters) associated with the selected function(s). The objective is to come up with a set of protection functions and logic between them such that the security (i.e. the success rate of activating the protection system when necessary) and dependability (i.e. the success rate of not activating the protection system if not necessary) of the protection system are maximized while being able to respond to any fault as fast as possible.

The expert engineer achieves this by anticipating potential events (e.g. faults and non-faults, such as inrush conditions, switching operations etc.) which are relevant to the protection design task at hand and performs numeric simulation (e.g. simulation of electromagnetic transients, post-fault steady-state short circuit analysis) of each of the selected events in order to identify the resulting signals which will be observed by the protection relays, based on which the protection function(s) will operate on the field. This allows one to define and test the protection functions, logic and settings for all anticipated events in order to ensure the correct decision. Typically, this is performed by following a set of engineering practices fine-tuned by the human engineer.

If the set of commonly used protection functions does not allow for an acceptable protection system performance, new protection functions need to be thought of. This is, in general, a difficult heuristic task.

The application of neural networks to power system protection, specifically to fault detection, classification, and location is proposed, e.g., in T. S. Sidhu, et al., "Design, implementation and testing of an artificial neural network based fault direction discriminator for protecting transmission lines", IEEE Transactions on Power Delivery, vol. 10, no. 2, pp. 697-706, 1995; D. Novosel et al., "Algorithms for locating faults on series compensated lines using neural network and deterministic methods, e techniques for real world applications", IEEE Transactions on Power Delivery, vol. 11, no. 4, pp. 1728-1736, 1996; A. G. Jongepier and L. van der Sluis, "Adaptive distance protection of double-circuit lines using artificial neural networks", IEEE Transactions on Power Delivery, vol. 12, no. 1, pp. 97-105, 1997; D. V. Coury and D. C. Jorge, "Artificial neural network approach to distance protection of transmission lines", IEEE Transactions on Power Delivery, vol. 13, no. 1, pp. 102-108, 1998; and M. Sanaye-Pasand and O. P. Malik, "Implementation and laboratory test results of an Elman network-based transmission line directional relay", IEEE Transactions on Power Delivery, vol. 14, no. 3, pp. 782-788, 1999.

Specific signal processing (e.g. short window Fourier transform or discrete wavelet transforms) have been suggested to extract valuable information from the voltage and current signal to use in protection functions. S. Vasilic and M. Kezunovic, "Fuzzy ART neural network algorithm for classifying the power system faults", IEEE Transactions on Power Delivery, vol. 20, no. 2, pp. 1306-1314, 2005; and U. Lahiri et al., "Modular neural network-based directional relay for transmission line protection", IEEE Transactions on Power Systems, vol. 20, no. 4, pp. 2154-2155, 2005 are exemplary.

Typical machine learning systems are powerful in their ability to learn a wide range of functions, but they behave as black box towards the human engineer. This may have various shortcomings. For illustration, it is normally not possible to understand for a human engineer how a decision logic obtained by training a machine learning model maps input signals to the various possible control actions. This makes the verification of the decision logic more challenging, and imposes challenging tasks on the human engineer when the decision logic may need to be revised in response to a change in power system topology or other updates to a power system.

SUMMARY

There is a need to provide improved techniques for generating a decision logic that is executed by a controller of an industrial automation control system, IACS, in particular a power distribution system or power generation system. There is in particular a need for improved techniques that allow the decision logic to be generated using machine learning (ML), while facilitating the interpretation of the decision logic that results from the ML process by an expert engineer for, e.g., verification purposes.

According to embodiments of the invention, methods and system are provided that allow machine learning to be harnessed for generating a decision logic (e.g., a decision logic of a protection relay). Machine learning models that are trained are specifically designed in such a way that one or several checkpoints are introduced in the computational flow. The checkpoint(s) facilitate the provision of information that indicates, e.g. using a graphical user interface (GUI), how inputs of the decision logic are processed into a limited number (e.g., two or three) of intermediate signals at the checkpoint(s), the intermediate signals at the checkpoint(s) are processed into the possible control actions, i.e., the outputs of the controller, and if several checkpoints are provided, how the trained machine learning model processes the intermediate signals at one of the checkpoints into intermediate signals at the consecutive checkpoint.

Thus, methods and devices are provided that use a specific machine learning architecture to act as interpretable protection logic. In this architecture, internal computations of the ML model are decomposed into several sub-processes.

The outputs of one of the sub-processes (which are also referred to as "intermediate signals" of the computation) are used to visualize operation of the trained ML model or otherwise provided information on the trained ML model. These outputs of one of the sub-processes form a checkpoint for interpretation, verification, visualization, and/or inspection of at least one of the computational sub-processes of the trained ML model, preferably of the whole trained ML model.

The machine learning model used in the methods and devices is designed in such a way that a small number of intermediate signals (such as two or three real-valued scalar intermediate signals) are handed over from one of the computational sub-processes to the next computational sub-process.

While the ML model that is being trained is artificially designed in such a manner that there is a small number of intermediate signals (such as two or three real-valued scalar intermediate signals) over from one of the computational sub-processes to the next computational sub-process, the dependency of the intermediate signals on the inputs of the ML model and the dependency of the outputs of the ML model on the intermediate signals is a result of the training process.

It will be appreciated that the interpretability of the trained ML model (which is deployed as decision logic to a controller) that is afforded by the disclosed methods and systems provides various benefits. For illustration, it is often desirable or required that an expert engineer can trace back the decision of the protection relay and deduce what led to that decision (e.g. the observed impedance was above/below a certain signal due to a specific disturbance/event).

According to embodiments, a protection function and logic, running in a controller (e.g., a protection relay), is implemented by a machine learning-based function which can make a decision on whether to actuate a circuit breaker based on received input signals, in a continuous manner.

Supervised machine learning can be used to train the ML model. The supervised machine learning can run fully automatically using labeled training data. Alternatively, reinforcement learning can be used.

A method of generating a decision logic for a controller of an Industrial Automation Control System, IACS, in particular for a controller for power system protection, according to an embodiment comprises performing machine learning, ML, using labeled data to thereby train a ML model to generate the decision logic. The ML model has ML model inputs and ML model outputs. The ML model is decomposed into a plurality of sub-processes to provide at least one intermediate checkpoint, wherein intermediate signals output by one of the computational sub-processes are input into a subsequent (e.g., consecutive) one of the computational sub-processes. The method may further comprise generating and outputting information on the trained ML model based on the intermediate signals for interpretation, verification, visualization, and/or inspection of at least one of the computational sub-processes.

The method is performed by at least one integrated circuit.

Performing machine learning can be or can comprise performing supervised machine learning.

Performing machine learning can be or can comprise performing reinforcement learning.

The intermediate signals output by one of the sub-processes and input into another one of the sub-processes serve as "checkpoint" for checking the operation of the trained ML model.

The method may further comprise controlling an optical output device to output graphics based on the generated information on the trained ML model.

The graphics may depend on at least one decision boundary of the decision logic as a function of the intermediate signals.

The graphics may depend on at least one numerical function of the decision logic as a function of the intermediate signals.

The decision logic may be a classifier that determines which one of at least two or at least three different control actions must be performed.

The graphics may visualize at least two decision boundaries separating the control actions.

The graphics may depend on a regression and/or scoring function.

The graphics may depict a dependence of the intermediate signals on the ML model inputs.

The graphics may include training data used to train the ML model.

A total number of the intermediate signals may be equal to or less than three.

The intermediate signals may be three or less than three real-valued scalar variables.

If several checkpoints are introduced, a total number of the intermediate signals may be equal to or less than three at at least one checkpoint and preferably at each of the checkpoints.

By implementing such a low-dimensional checkpoint, mappings between the checkpoints can be fully visualized, interpreted, and checked by a human engineer.

The number of computational sub-processes may be less than five, in particular less than four, in particular two or three.

The intermediate signals output by a first computational sub-process may be input into two separate second computational sub-processes that operate in parallel.

The two second computational sub-processes that operate in parallel may be associated with different classification tasks. For illustration, one of the second computational sub-processes may determine whether a circuit breaker is to trip. Another one of the second computational sub-processes may determine whether a trip, if it takes place, is an immediate or delayed trip.

Both the first and the second computational sub-processes may respectively include an artificial neural network (ANN). The ANN may be a feed-forward ANN with non-linear activation.

Each one of the second sub-processes may be a binary classification task.

A total number of the intermediate signals may be greater than three. The intermediate signals may be more than three real-valued scalar variables. The method may further comprise performing a projection of the decision boundary into a two- or three-dimensional space.

A graphics may be generated that visualizes the projection of the decision boundary into the two- or three-dimensional space.

The projection may be a linear or nonlinear projection. Projecting into lower-dimensional spaces may involve integration along a line which may be rectilinear or a curved.

The ML may be performed iteratively by learning in stages.

A new iteration of ML may be initiated when the performance of the trained ML model is deemed to be insufficient and/or when the decision logic is considered to be too complex in order to be understandable by a human expert.

When the decision logic is considered to be too complex to be understandable or interpretable by a human expert, parts of a computational graph of the ML model may be replaced or removed in the sub sequent iteration of the learning by stages approach.

The method may comprise selectively modifying the ML model, including removing and/or replacing at least part of a computational graph, and repeating the ML for the modified ML model.

The ML model may be selectively modified in response to a user input or in response to an automatic evaluation of the dependency of the intermediate values on the ML model inputs and/or the dependency of the ML model outputs on the intermediate values.

The decision on whether the trained ML model is considered to be interpretable by a human expert may be taken automatically, rather than by relying on user input.

For illustration, topological characteristics of a decision boundary of the trained ML model may be used in order to determine whether a new iteration of the learning by stages approach is required.

Alternatively or additionally, learning in stages may be used to replace parts of a sub-process that has been trained by machine learning (e.g., by supervised machine learning or reinforcement learning). For illustration, if a sub-process, after training, resembles a linear or other explicitly known function, the sub-process may be replaced by that explicitly known function to further facilitate the interpretability of the trained ML model, which is then used as decision logic.

The ML model may receive time-dynamical inputs that include, for each of a plurality of time steps, an N-tuple of ML model inputs.

The ML model may then generate ML model outputs for each of the time steps.

The method may further comprise generating aggregated information from the N-tuples of ML model inputs for the plurality of time steps and using the aggregated information in combination with the intermediate signals to generate the information on the trained ML model.

The method may generally comprise generating aggregated information from N-tuples of ML model inputs and using the aggregated information in combination with the intermediate signals to generate the information on the trained ML model.

The ML model may receive plural sets of ML model inputs.

The plural sets of ML model inputs may be grouped according to time or according to signal type. Grouping may refer to the act of determining which signals are together supplied to a computational sub-process, such as an artificial neural network or other classifier or computational sub-process.

The different groups to respectively a different artificial neural network or other classifier or computational sub-process.

The plural sets of ML model inputs may be grouped differently depending on the type of decision logic that is to be generated. For illustration, for a first type of decision logic, a grouping of signals by signal type may be used, while a grouping by time may be used for a second type of decision logic.

Grouping by time may be implemented in such a way that signals that relate to the same time but have different signal type (e.g., direct voltage, direct current, q current, zero current) are supplied to the same artificial neural network or other classifier or computational sub-process. A first set of signals having different signal types but relating to the same first time (e.g., direct voltage, direct current, q current, zero current at the first time) may be supplied to a first ANN, classifier, or computational sub-process. A second set of signals having these different signal types but relating to the same second time (e.g., direct voltage, direct current, q current, zero current at the second time) that is different from the first time may be supplied to a second ANN, classifier, or computational sub-process. The second ANN may have the same number of layers and nodes as the first ANN, but may have weights that are determined independently of those for the first ANN. This concept may be extended to more than two times.

Grouping by signal type may be implemented in such a way that signals that have the same signal type (e.g., one of: direct voltage, direct current, q current, zero current) but relate to different times (such as direct voltages measured at first, second, third and fourth times) are supplied to the same artificial neural network or other classifier or computational sub-process. A first set of signals having the same signal type but relating to different times (such as direct voltages measured at first, second, third and fourth times) may be supplied to a first ANN, classifier, or computational sub-process. A second set of signals having a different signal type but relating to the same times (such as direct currents measured at first, second, third and fourth times) may be supplied to a second ANN, classifier, or computational sub-process. The second ANN may have the same number of layers and nodes as the first ANN, but may have weights that are determined independently of those for the first ANN. This concept may be extended to more than two signal types.

When the ML model is a dynamic ML model, time-series data may be used for simultaneously learning the static and dynamic part of a computational graph.

Alternatively, in order to train a dynamic ML model, a static part of a computational graph may be learned first. Subsequently, the dynamic part (which involves the provision of data from the computational graph at one time slot to the computational graph at the next time slot) can be trained.

Alternatively, in order to train a dynamic ML model, a static part of a computational graph may be learned, and that dynamic part may be adapted without learning, e.g., based on expert knowledge.

The method may further comprise deploying the decision logic obtained by training the ML model to the controller for execution.

The ML model may include an artificial neural network.

The ML model may include plural artificial neural networks. The plural artificial neural networks may be distinguished from each other by the feed-forward function and/or the number of hidden layers.

The ML model may consist of a plurality of artificial neural networks.

The ML model may include at least one support vector machine (SVM).

The decision logic may be a power system protection logic.

The decision logic may be a distance protection logic.

The decision logic may be a protection relay decision logic.

The output of the decision logic, i.e., the ML model output, may determine which one of a predefined set of control actions is to be performed.

The decision logic may determine whether a circuit breaker is to trip, and, optionally, whether the trip is an immediate or delayed trip.

The ML model outputs may correspond to control actions for immediate trip, trip with delay, and restrain of a circuit breaker.

While raw signals may be input into the ML model, pre-processing may be performed to compute the inputs that are input into the ML model from the raw signals. For illustration, the ML model inputs may include phase currents and phase voltages. This data may be in the form of raw signals, phasors, sequence components, superimpose quantities, or wavelet decompositions.

Additionally or alternatively, the ML model inputs may include phase impedances. This data may be in the form of sequence components or fault type specific impedances calculated based on current and voltage phasors.

Additionally or alternatively, the ML model inputs may include phase admittances. This data may be in the form of sequence components or fault type specific admittances calculated based on current and voltage phasors.

Additionally or alternatively, the ML model inputs may include phase apparent powers, or sequence components of apparent powers, calculated based on current and voltage phasors.

Additionally or alternatively, the ML model inputs may include a frequency spectrum of voltage and/or current signals. The frequency spectrum may be determined using a short-term Fourier or discrete wavelet transformation. The time-frequency analysis may be performed on voltage and current signals following a modal transformation.

Additionally or alternatively, the ML model inputs may include a sliding window over any feature mentioned above. For illustration, the ML model inputs and/or the intermediate values may be representative of a finite impulse response (FIR) filter or infinite impulse response (IIR) filter over a time series.

Additionally or alternatively, the ML model inputs may include information from adjacent substations as well as from a wider area. Such information may include frequency measurements or other information.

When pre-processing of signals is performed prior to inputting into the ML model, the method may further comprise selecting a plurality of potential candidate combinations of signals and executing the machine learning. This may be repeated for different candidate combinations of signals.

In an example embodiment, the ML model may include a first artificial neural network that receives the ML model inputs and that outputs three real-valued intermediate signals. The ML model may include at least one and preferably to second artificial neural networks that receive the 3 real-valued intermediate signals and output binary decisions identifying control actions. One second artificial neural network may output a binary decision that indicates whether in a circuit breaker trip or circuit breaker restrained is to be performed. Another second artificial neural network may output are binary decision that indicates that for an immediate trip or delayed trip is performed.

Performing the machine learning may comprise pre-processing the labeled training data to compute three complex-valued admittances associated with three different phases, in order to generate the ML model inputs for the machine learning.

The ML model inputs may be three complex-valued admittances associated with three different phases. The ML model inputs may be three complex-valued admittances that are obtained by a pre-processing, which implements a feature selection. Generating and outputting the information associated with the decision logic may comprise:
  generating and outputting at least one first graph representing the interdependence of one of the intermediate signals on the real and imaginary parts of one of the admittances; and/or
  generating and outputting at least one second graph representing the interdependence of decision boundaries between different control actions (such as circuit breaker restrained, immediate circuit breaker trip, and circuit breaker trip with delay) on three real-valued intermediate signals.

The method may further comprise ensuring that the number of ML model inputs remains less than or equal to a predetermined threshold. The predetermined threshold may be ten, nine, eight, seven, six, or less than six.

The method may further comprise automatically performing a feature selection task using a search algorithm that identifies the combination of signals to be used as ML model inputs that shows the best performance, while optionally ensuring that the decision logic remains interpretable by a human engineer.

The method may further comprise performing a regularization or ANN pruning technique to limit the number of ML model inputs.

The ML model may be selected from a database of possible ML models. The method may further comprise automatically determining, based on a topology of the power system or IACS, which of the ML models is to be trained.

The topology may be determined automatically from a standardized configuration description, such as an SCD file in accordance with IEC 61850.

The method may further comprise automatically executing an assessment module that assesses whether the decision logic obtained by training the ML model meets a predefined criterion.

The predefined criterion may be a metric quantifying whether the mapping between the ML model inputs and the intermediate signals and/or the mapping between the intermediate signals and the ML model outputs can be interpreted by a human expert.

Alternatively or additionally, the assessment module may assess whether the decision logic has expected characteristics. For illustration, if the physical system underlying the decision-making process has a certain symmetry (as may be the case for fault protection in a 3-phase power system), the assessment module may assess whether the trained ML model has characteristics that are in conformity with this symmetry. For illustration, the assessment module may assess whether the intermediate values and/or ML model outputs behave as expected under a permutation of features ML model inputs for which a symmetry is expected (such as cyclic permutation of 3-phase impedances when the electric power system is symmetric under such a cyclic permutation).

The assessment module may be trained by means of machine learning.

The method may further comprise automatically executing at least the step of performing ML to generate the decision logic in response to a trigger signal or event.

The trigger may be a change in power system topology and/or an exchange of an intelligent electronic device (IED) in the power system.

According to a further embodiment, a method of controlling a device of an IACS, in particular a power system asset such as a circuit breaker, comprises:

generating, using the method according to an embodiment, a decision logic for a controller;

deploying the decision logic to the controller for execution; and executing, by at least one integrated circuit of the controller, the decision logic during life operation of the IACS, e.g., of the power system.

The decision logic may be selectively deployed to the controller only if, during generating the decision logic, the decision logic is considered to meet a predefined criterion. The predefined criterion may be dependent on a topology of one or several decision boundaries or other characteristics that define the mapping between the ML model inputs and the intermediate values and/or between the intermediate values and the ML model outputs.

The predefined criterion may be dependent on whether the mapping between the ML model inputs and the intermediate values and/or between the intermediate values and the ML model outputs can be understood by a human expert.

Executing the decision logic may comprise outputting, by the controller, a control command to a power system asset.

The control command may trigger a circuit breaker trip.

The controller may be a controller that performs at least one distance protection function.

The controller may be a digital protection relay.

The controlled device may be a circuit breaker.

The controlled device may be a primary component of a power generation, power distribution, or power transmission system.

The method may further comprise repeating the steps of generating and deploying the decision logic in response to a trigger signal or event.

The trigger may be a change in power system topology and/or an exchange of an intelligent electronic device (IED) in the power system.

The method may further comprise receiving raw signals from sensors and/or merging units.

The method may further comprise pre-processing, by the controller, the received raw signals to generate ML model inputs that are input into the decision logic executed by the controller.

Pre-processing the received raw signals may comprise computing phase impedances. This data may be computed in the form of sequence components or fault type specific impedances calculated based on current and voltage phasors.

Pre-processing the received raw signals may comprise computing phase admittances. This data may be computed in the form of sequence components or fault type specific admittances calculated based on current and voltage phasors.

Pre-processing the received raw signals may comprise computing phase apparent powers, or sequence components of apparent powers, calculated based on current and voltage phasors.

Pre-processing the received raw signals may comprise computing a frequency spectrum of voltage and/or current signals. The frequency spectrum may be determined using a short-term Fourier or discrete wavelet transformation. The time-frequency analysis may be performed on voltage and current signals following a modal transformation.

Pre-processing the received raw signals may comprise applying signal transformation such as Clarke or dq0 transform to voltages and currents.

Pre-processing the received raw signals may comprise of applying custom digital filter with coefficients delivered through ML based technique.

Pre-processing the received raw signals may comprise using information from adjacent substations as well as from a wider area. Such information may include frequency measurements or other information.

A computer system for generating a decision logic for a controller of an Industrial Automation Control System, IACS, in particular for a controller for power system protection according to an embodiment comprises at least one integrated circuit adapted to perform machine learning, ML, using labeled data to thereby train a ML model to generate the decision logic. The ML model has ML model inputs and ML model outputs. The ML model is decomposed into a plurality of sub-processes, wherein intermediate signals output by one of the computational sub-processes are input into a subsequent (e.g., consecutive) one of the computational sub-processes. The at least one integrated circuit is adapted to generate information on the trained ML model based on the intermediate signals for interpretation, verification, visualization, and/or inspection of at least one of the computational sub-processes. The computer system further has an output interface adapted to output the information on the trained ML model.

The at least one integrated circuit is adapted to perform supervised machine learning or reinforcement learning generate the decision logic.

The output interface may be an optical output device adapted to output graphics based on the generated information on the trained ML model.

The computer system may be adapted such that the graphics output by the optical output device may depend on at least one decision boundary of the decision logic as a function of the intermediate signals.

The computer system may be adapted such that the graphics output by the optical output device may depend on at least one numerical function of the decision logic as a function of the intermediate signals.

The computer system may be adapted such that the decision logic is a classifier that determines which one of at least two or at least three different control actions is to be performed.

The computer system may be adapted such that the graphics output by the optical output device may visualize at least two decision boundaries separating the control actions.

The computer system may be adapted such that the graphics depend on a regression and/or scoring function.

The computer system may be adapted such that the graphics depict a dependence of the intermediate signals on the ML model inputs.

The computer system may be adapted such that the graphics include training data used to train the ML model.

The computer system may be adapted such that a total number of the intermediate signals is equal to or less than three. The intermediate signals may be three or less than three real-valued variables.

The computer system may be adapted such that, if several checkpoints are introduced, a total number of the intermediate signals may be equal to or less than three at at least one checkpoint and preferably at each of the checkpoints.

The computer system may be adapted such that the number of computational sub-processes may be less than five, in particular less than four, in particular two or three.

The computer system may be adapted such that the intermediate signals output by a first computational sub-process may be input into two separate second computational sub-processes that operate in parallel.

The computer system may be adapted such that the two second computational sub-processes that operate in parallel may be associated with different classification tasks. For illustration, one of the second computational sub-processes may determine whether a circuit breaker is to trip. Another one of the second computational sub-processes may determine whether a trip, if it takes place, is an immediate or delayed trip.

The computer system may be adapted such that both the first and the second computational sub-processes may respectively include an artificial neural network (ANN). The ANN may be a feed-forward ANN with nonlinear activation.

The computer system may be adapted such that each one of the second sub-processes may be a binary classification task.

The computer system may be adapted such that a total number of the intermediate signals is greater than three. The computer system may be adapted to perform a projection of the decision boundary into a two- or three-dimensional space.

The computer system may be adapted such that a graphics may be generated that visualizes the projection of the decision boundary into the two- or three-dimensional space.

The computer system may be adapted such that the projection may be a linear or nonlinear projection. Projecting into lower-dimensional spaces may involve integration along a line which may be rectilinear or a curved.

The computer system may be adapted such that the ML may be performed iteratively by learning in stages.

The computer system may be adapted such that a new iteration of ML may be selectively initiated when the performance of the trained ML model is deemed to be insufficient and/or when the decision logic is considered to be too complex in order to be interpretable by a human expert.

The computer system may be adapted such that parts of a computational graph of the ML model may be selectively replaced or removed in a subsequent iteration of the learning by stages approach.

The computer system may be adapted such that the ML model is selectively modified in response to a user input or in response to an automatic evaluation of the dependency of the intermediate values on the ML model inputs and/or the dependency of the ML model outputs on the intermediate values.

The computer system may be adapted to, in response to determining that the information on the trained ML model does not fulfill an interpretability criterion, modify the ML model. This may include removing and/or replacing at least part of a computational graph, and repeating the ML for the modified ML model.

The computer system may be adapted to automatically take a decision on whether the trained ML model is considered to be interpretable by a human expert.

The computer system may be adapted to use topological characteristics of a decision boundary of the trained ML model may be used in order to determine whether a new iteration of the learning by stages approach is required.

The computer system may be adapted to use learning in stages to replace parts of a sub-process that has been trained by machine learning (e.g., by supervised machine learning or reinforcement learning). For illustration, if a sub-process, after training, resembles a linear or other explicitly known function, the sub-process may be replaced by that explicitly known function to further facilitate the interpretability of the trained ML model, which is then used as decision logic.

The computer system may be adapted such that the ML model may receive time-dynamical inputs that include, for each of a plurality of time steps, an N-tuple of ML model inputs.

The computer system may be adapted such that the ML model then generates ML model outputs for each of the time steps.

The computer system may be adapted to generate aggregated information from the N-tuples of ML model inputs for the plurality of time steps and using the aggregated information in combination with the intermediate signals to generate the information on the trained ML model.

The computer system may be generally adapted to generate aggregated information from N-tuples of ML model inputs and to use the aggregated information in combination with the intermediate signals to generate the information on the trained ML model.

The ML model may receive plural sets of ML model inputs.

The plural sets of ML model inputs may be grouped according to time or according to signal type. Grouping may refer to the act of determining which signals are together supplied to a computational sub-process, such as an artificial neural network or other classifier or computational sub-process.

The computer system may be adapted to supply the different groups to respectively a different artificial neural network or other classifier or computational sub-process.

The computer system may be adapted such that the plural sets of ML model inputs are grouped differently depending on the type of decision logic that is to be generated. For illustration, for a first type of decision logic, a grouping of signals by signal type may be used, while a grouping by time may be used for a second type of decision logic.

The computer system may be adapted such that grouping by time may be implemented in such a way that signals that relate to the same time but have different signal type (e.g., direct voltage, direct current, q current, zero current) are supplied to the same artificial neural network or other classifier or computational sub-process. A first set of signals having different signal types but relating to the same first time (e.g., direct voltage, direct current, q current, zero current at the first time) may be supplied to a first ANN, classifier, or computational sub-process. A second set of signals having these different signal types but relating to the same second time (e.g., direct voltage, direct current, q current, zero current at the second time) that is different from the first time may be supplied to a second ANN, classifier, or computational sub-process. The second ANN may have the same number of layers and nodes as the first ANN, but may have weights that are determined independently of those for the first ANN. This concept may be extended to more than two times.

The computer system may be adapted such that grouping by signal type may be implemented in such a way that signals that have the same signal type (e.g., one of: direct voltage, direct current, q current, zero current) but relate to different times (such as direct voltages measured at first, second, third and fourth times) are supplied to the same artificial neural network or other classifier or computational sub-process. A first set of signals having the same signal type but relating to different times (such as direct voltages measured at first, second, third and fourth times) may be supplied to a first ANN, classifier, or computational sub-process. A second set of signals having a different signal type but relating to the same times (such as direct currents measured at first, second, third and fourth times) may be supplied to a second ANN, classifier, or computational sub-process. The second ANN may have the same number of layers and nodes as the first ANN, but may have weights that are determined independently of those for the first ANN. This concept may be extended to more than two signal types.

The computer system may be adapted such that, when the ML model is a dynamic ML model, time-series data may be used for simultaneously learning the static and dynamic part of a computational graph.

The computer system may be adapted such that, in order to train a dynamic ML model, a static part of a computational graph may be learned first. Subsequently, the dynamic part (which involves the provision of data from the computational graph at one time slot to the computational graph at the next time slot) can be trained.

The computer system may be adapted such that, in order to train a dynamic ML model, a static part of a computational graph may be learned, and that dynamic part may be adapted without learning, e.g., based on expert knowledge.

The computer system may be adapted to deploy the decision logic obtained by training the ML model to the controller for execution.

The computer system may be adapted such that the ML model includes an artificial neural network.

In an exemplary embodiment, the ML model may include a first artificial neural network that receives the ML model inputs and that outputs three real-valued intermediate signals. The ML model may include at least one and preferably to second artificial neural networks that receive the three real-valued intermediate signals and output binary decisions identifying control actions. One second artificial neural network may output a binary decision that indicates whether in a circuit breaker trip or circuit breaker restrained is to be performed. Another second artificial neural network may output are binary decision that indicates that for an immediate trip or delayed trip is performed.

The computer system may be adapted such that the ML model inputs are three complex-valued admittances associated with three different phases.

The computer system may be adapted such that performing the machine learning may comprise pre-processing the labeled training data to compute three complex-valued admittances associated with three different phases, in order to generate the ML model inputs for the machine learning.

The computer system may be adapted such that generating and outputting the information associated with the decision logic may comprise:
  generating and outputting at least one first graph representing the interdependence of one of the intermediate signals on the real and imaginary parts of one of the admittances; and/or
  generating and outputting at least one second graph representing the interdependence of decision boundaries between different control actions (such as circuit breaker restrained, immediate circuit breaker trip, and circuit breaker trip with delay) on three real-valued intermediate signals.

The computer system may be adapted such that the ML model may include plural artificial neural networks.

The plural artificial neural networks may be distinguished from each other by the feed-forward function and/or the number of hidden layers.

The computer system may be adapted such that the ML model may consist of a plurality of artificial neural networks.

The computer system may be adapted such that the ML model may include at least one support vector machine (SVM).

The computer system may be adapted such that the decision logic is a power system protection logic.

The computer system may be adapted such that the decision logic is a protection relay decision logic.

The computer system may be adapted such that the output of the decision logic, i.e., the ML model output, determines which one of a predefined set of control actions is to be performed.

The computer system may be adapted such that the decision logic determines whether a circuit breaker is to trip, and, optionally, whether the trip is an immediate or delayed trip.

The computer system may be adapted such that the ML model outputs may correspond to control actions for immediate trip, trip with delay, and restrain of a circuit breaker.

The computer system may be adapted such that the ML model inputs include 3-phase admittances of a line or may be based on features computed from the 3-phase admittances.

The computer system may be adapted such that raw signals may be input into the ML model. The computer system may be adapted to perform pre-processing to compute the inputs that are input into the ML model from the raw signals.

For illustration, the computer system may be adapted such that the ML model inputs may include phase currents and phase voltages. This data may be in the form of raw signals, phasors, sequence components, superimpose quantities, or wavelet decompositions.

Additionally or alternatively, the computer system may be adapted such that the ML model inputs may include phase impedances. This data may be in the form of sequence components or fault type specific impedances calculated based on current and voltage phasors.

Additionally or alternatively, the computer system may be adapted such that the ML model inputs may include phase admittances. This data may be in the form of sequence components or fault type specific impedances calculated based on current and voltage phasors.

Additionally or alternatively, the computer system may be adapted such that the ML model inputs may include phase apparent powers, or sequence components of apparent powers, calculated based on current and voltage phasors.

Additionally or alternatively, the computer system may be adapted such that the ML model inputs may include a frequency spectrum of voltage and/or current signals. The frequency spectrum may be determined using a short-term Fourier or discrete wavelet transformation. The time-frequency analysis may be performed on voltage and current signals following a modal transformation.

Additionally or alternatively, the computer system may be adapted such that the ML model inputs may include a sliding window over any feature mentioned above. For illustration, the ML model inputs and/or the intermediate values may be representative of a finite impulse response (FIR) filter or infinite impulse response (IIR) filter over a time series.

Additionally or alternatively, the computer system may be adapted such that the ML model inputs may include a voltage and/or current transformed by Clarke or dq0 transform.

Additionally or alternatively, the computer system may be adapted such that the ML model inputs may include custom digital filter with coefficients delivered through ML based technique.

Additionally or alternatively, the computer system may be adapted such that the ML model inputs may include information from adjacent substations as well as from a wider area. Such information may include frequency measurements or other information.

When pre-processing of signals is performed prior to inputting into the ML model, the computer system may be adapted to select a plurality of potential candidate combinations of signals and executing the machine learning. This may be repeated for different candidate combinations of signals.

The computer system may be adapted to ensure that the number of ML model inputs remains less than or equal to a predetermined threshold. The predetermined threshold may be ten, nine, eight, seven, six, or less than six.

The computer system may be adapted to automatically perform a feature selection task using a search algorithm that identifies the combination of signals to be used as ML model inputs that shows the best performance, while optionally ensuring that the decision logic remains interpretable by a human engineer.

The computer system may be adapted to perform a regularization or ANN pruning technique to limit the number of ML model inputs.

The computer system may be adapted to select the ML model from a database of possible ML models. The computer system may be adapted to automatically determine, based on a topology of the power system or IACS, which of the ML models is to be trained.

The computer system may be adapted to automatically determine the topology from a standardized configuration description, such as an SCD file in accordance with IEC 61850, of the IACS or power system in which the controller is used.

The computer system may be adapted to automatically execute an assessment module that assesses whether the decision logic obtained by training the ML model meets a predefined criterion.

The computer system may be adapted such that the predefined criterion may be a metric quantifying whether the mapping between the ML model inputs and the intermediate signals and/or the mapping between the intermediate signals and the ML model outputs can be interpreted by a human expert.

Alternatively or additionally, the computer system may be adapted such that the assessment module may assess whether the decision logic has expected characteristics. For illustration, if the physical system underlying the decision-making process has a certain symmetry (as may be the case for fault protection in a 3-phase power system), the assessment module may assess whether the trained ML model has characteristics that are in conformity with this symmetry. For illustration, the assessment module may assess whether the intermediate values and/or ML model outputs behave as expected under a permutation of features ML model inputs for which a symmetry is expected (such as cyclic permutation of 3-phase impedances when the electric power system is symmetric under such a cyclic permutation).

The assessment module may be trained by means of machine learning.

The computer system may be adapted to repeat the generation of the decision logic in response to a trigger signal or event.

The trigger may be a change in power system topology and/or an exchange of an intelligent electronic device (IED) in the power system.

An Industrial Automation Control System, IACS, in particular a power system, comprises a controller adapted to execute a decision logic to decide which one of several control actions is taken, and the computer system according to the invention for generating the decision logic.

The computer system may be adapted such that the decision logic may be selectively deployed to the controller only if, during generating the decision logic, the decision logic is considered to meet an predefined criterion. The predefined criterion may be dependent on a topology of one or several decision boundaries or other characteristics that define the mapping between the ML model inputs and the intermediate values and/or between the intermediate values and the ML model outputs.

The predefined criterion may be dependent on whether the mapping between the ML model inputs and the intermediate values and/or between the intermediate values and the ML model outputs can be understood by a human expert.

The controller may be adapted to execute the decision logic to generate and output a control command to a power system asset.

The control command may trigger a circuit breaker trip.

The controller may be a digital protection relay.

The system may further comprise a control device. The controlled device may be a circuit breaker. The controlled device may be a primary component of a power generation, power distribution, or power transmission system.

The controller may be adapted to receive raw signals from sensors and/or merging units.

The controller may be adapted to pre-process the received raw signals to generate ML model inputs that are input into the decision logic executed by the controller.

The controller may be adapted such that pre-processing the received raw signals may comprise computing phase impedances. This data may be computed in the form of sequence components or fault type specific impedances calculated based on current and voltage phasors.

The controller may be adapted such that pre-processing the received raw signals may comprise computing phase admittances. This data may be computed in the form of sequence components or fault type specific admittances calculated based on current and voltage phasors.

The controller may be adapted such that pre-processing the received raw signals may comprise computing phase apparent powers, or sequence components of apparent powers, calculated based on current and voltage phasors.

Pre-processing the received raw signals may comprise computing a frequency spectrum of voltage and/or current signals. The frequency spectrum may be determined using a short-term Fourier or discrete wavelet transformation. The time-frequency analysis may be performed on voltage and current signals following a modal transformation.

The controller may be adapted such that pre-processing the received raw signals may comprise computing Clarke or dq0 transformation.

The controller may be adapted such that pre-processing the received raw signals may comprise applying custom digital filter with coefficients delivered through ML based technique.

The controller may be adapted such that pre-processing the received raw signals may comprise using information from adjacent substations as well as from a wider area. Such information may include frequency measurements or other information.

Various effects are attained by the methods and computer systems according to embodiments.

For illustration, the methods and systems according to embodiments facilitate automating the process of designing decision logic. A human expert engineer can influence the process, e.g., by selecting the labeled training data that is used in the learning. A human expert engineer can also visualize, review, or control the decision logic that is generated by the machine learning, based on the checkpoint(s) introduced at one or several positions of the computational graph. This facilitates the interaction of the human expert engineer with the machine learning process.

The methods and systems according to embodiments also facilitate much quicker redesign in case of additional requirements due to anticipated or unknown changes in power system topologies and parameters. For illustration, when such changes can be mapped to the relevant training data, e.g. by representing them in the corresponding simulation system, or by observing them from operational data, the redesign of the decision logic can be facilitated by the specific way in which the ML model is set up. Often, only some, but not all of the sub-processes may have to undergo re-training.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Example embodiments of the invention will be described with reference to the drawings in which identical or similar reference signs designate identical or similar elements. While some embodiments will be described in the context of a power generation system or power distribution system, the methods and devices described in detail below may be used in a wide variety of system.

The features of embodiments may be combined with each other, unless specifically noted otherwise.

According to embodiments of the invention, machine learning (such as supervised machine learning or reinforcement learning) is used to generate a decision logic of a controller of an Industrial Automation Control System (IACS), such as an electric power system. Protection functions in electric power systems (such as power generation or power transmission systems) are examples for such a decision logic. For illustration, the techniques disclosed herein may be used to generate the decision logic of a digital protection relay, using machine learning techniques, without being limited thereto.

Figure 1:
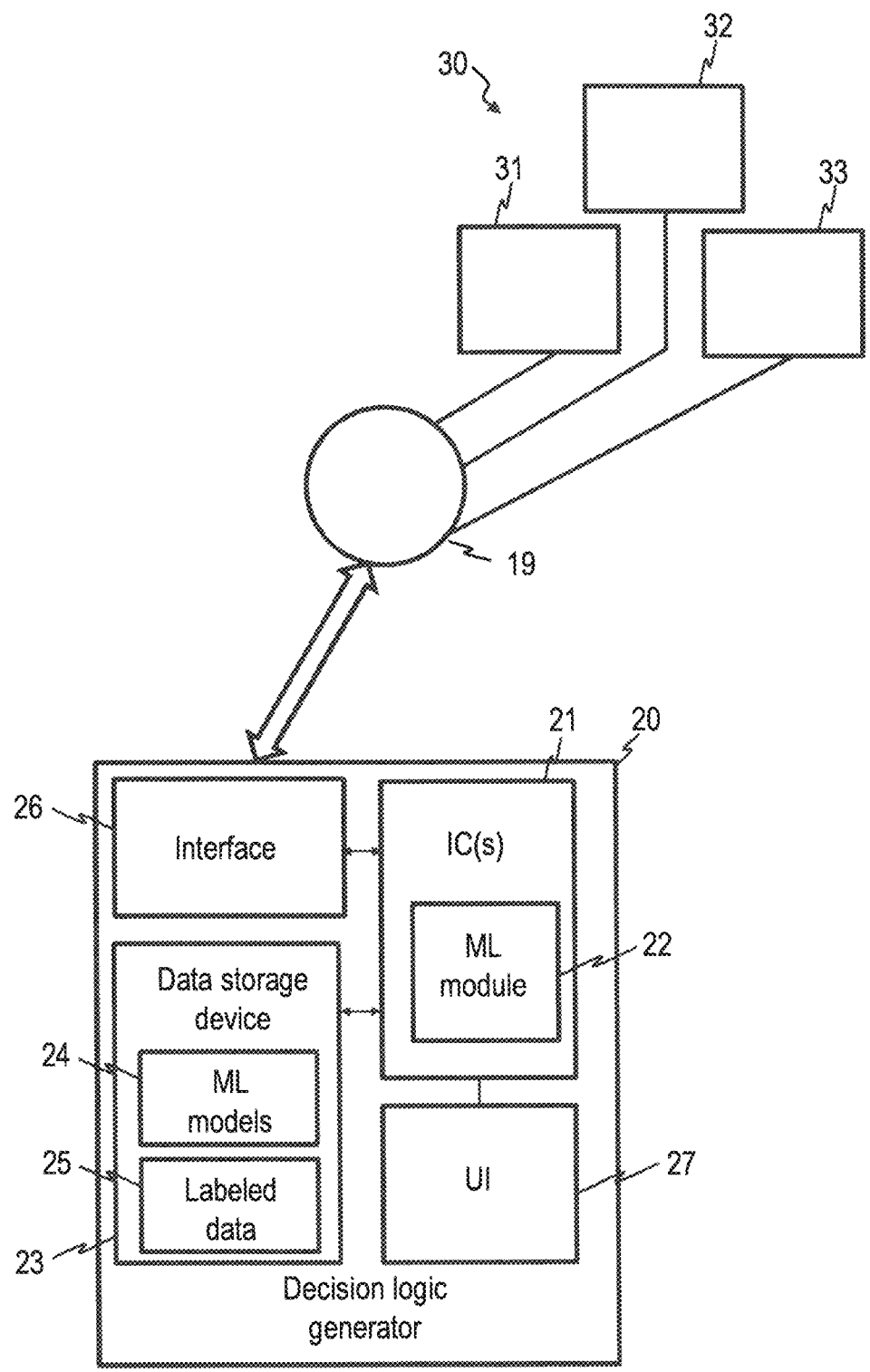
FIG. 1 is a schematic representation of a system comprising a protection logic generator.

FIG. 1 is a schematic representation of a system according to an embodiment.

The system comprises one or several controllers 31, 32, 33, collectively referred to as controllers 30. The controllers 31, 32, 33 may respectively be operative to perform functions, such as protection functions, in response to signals from sensors, merging units, intelligent electronic devices (IEDs) or other devices that provide data relating to operation of an IACS, power generation system, power transmission system, or power distribution system. For illustration, one or several of the controllers 31, 32, 33 may be a digital protection relay that determines whether a circuit breaker (CB) is to trip, and whether a trip is an immediate or delayed trip.

Importantly, and as will be explained in detail below, the decision logic executed by one or several of the controllers 31, 32, 33 is respectively a machine learning (ML) model that has been trained. A decision logic generator 20 generates the decision logic by training the ML model. The trained ML model may be deployed to the respective controller 31, 32, 33 for execution during live operation of the IACS, e.g., operation of an electric power system.

As used herein, the term "decision logic" in particular can refer to the logic that, when executed by a controller 31, 32, 33 of the electric power system (or of another IACS), causes the controller to determine which control action is to be taken in response to signals provided by one or several data sources (sensors, merging units, etc.). The control action may include circuit breaker (CB) trip or CB restrain. The control action may be selected from immediate trip, trip with delay, and restrain of a CB.

The decision logic generator 20 may be implemented by computer(s), server(s) or distributed computing systems. The decision logic generator 20 includes at least one integrated circuit 21. The at least one integrated circuit may comprise a processor, a microprocessor, a controller, a microcontroller, and application specific integrated circuit (ASIC) or any combination thereof.

The at least one integrated circuit 21 may be operative to execute a machine learning module 22. The machine learning module 22 may be operative to execute supervised machine learning or reinforcement learning to train a ML model. The ML model may include an artificial neural network (ANN) or plural ANNs. The machine learning module 22 may be operative to perform the supervised machine learning according to any one of a variety of techniques, such as reinforcement learning or stochastic gradient descent.

As used herein, "training the ML model" refers to the process of determining parameter signals for parameters of the ML model. For illustration, training the ML model may include determining the weights of an ANN.

Labeled data 25 used for the supervised ML may be stored in a data storage device 23. The labeled data 25 may include historical data (representing previous operational conditions and control actions) and/or simulated data. The labeled data 25 may be retrieved by the ML module 22 for performing the supervised machine learning. Appropriate labeled data 25 may be specified by a human expert engineer. It will be appreciated that significant amounts of suitable labeled data 25 are available from historical records.

A set of candidate ML models 24 may be stored for being trained. The set of candidate ML models 24 may be stored locally in the data storage device 23 or remotely. The set of candidate ML models 24 may correspond to different power system configurations and/or topologies. One of the several ML models 24 may be selected by a human engineer. Alternatively, the decision logic generator 20 may automatically select one of the several ML models 24 for training Information on the topology of the power system, e.g., of a power generation, distribution, or transmission system, may be used for selecting a ML model 24 for training. The integrated circuit(s) 21 may be adapted to analyze a standardized configuration description, such as an SCD file, of the power system, to determine which one of the plural ML models 24 is to be trained by supervised machine learning.

The various ML models 24 may be distinguished from each other in, e.g., the arrangement and number of different artificial neural networks used the therein, the feed-forward functions of the artificial neural networks, the number of layers, etc.

The decision logic generator 20 machine learning of one or several of the ML models 24. The labeled data 25 is used in this process.

As will be described in more detail below, the ML models 24 have a specific configuration in that they are subdivided into plural computational sub-processes. For illustration, a ML model 24 that is selected for performing supervised training may include at least a first artificial neural network and at least one second artificial neural network that receives the outputs of the first artificial neural network. According to embodiments of the invention, the number of outputs of the first artificial neural network (that are also referred to as intermediate signals of the decision logic herein) is limited. For illustration, the ML models 24 can be set up in such a way that the first artificial neural network outputs at most three real-valued numbers as intermediate signals. These intermediate signals are then supplied to one, or preferably more than one, second artificial neural network.

In this manner, the ML models 24 are specifically designed in such a way that they include one or several checkpoints. The checkpoints are the points in the computational flow or computational graph at which the intermediate signals are available. For illustration, in the above-described example, a checkpoint is provided by the outputs of the first artificial neural networks, which serve as inputs to the second artificial neural network.

The decision logic generator 20 has a user interface 27. The user interface 27 may include an optical output device. The decision logic generator 20 may be operative to output, via the user interface 27, information that allows a human operator to check, verify, visualize, or otherwise assess how the trained ML model, which has desired performance characteristics, behaves. For illustration, the integrated circuit(s) 21 of the decision logic generator 20 may be adapted to generate and output graphics via the user interface 27 to illustrate how the trained ML model behaves.

The decision logic generator 20 may be adapted such that the output graphics may include one or several of the following:

information on how inputs of the trained ML model, which is intended to be used as decision logic, are processed into the intermediate signals at the checkpoint(s), information on how the intermediate signals at the checkpoint(s) are processed into the possible control actions, i.e., the outputs of the controller, and if several checkpoints are provided, how the trained machine learning model processes the intermediate signals at one of the checkpoints into intermediate signals at the consecutive checkpoint. Information on how the intermediate signals map into possible control actions may, for example, include a three-dimensional graphics that depicts decision boundaries or projections of decision boundaries.

The decision logic generator 20 may have an interface 26 for outputting the decision logic, which is obtained by supervised machine learning of an ML model. The interface 26 may be communicatively coupled, e.g. via a communication hub 19, to the controllers 31, 32, 33. It will be appreciated that different decision logic's will be output to each one of the controllers 31, 32, 33, depending on the configuration and topology of the power generation, distribution or transmission system in which the respective controllers are used.

The decision logic generator 20 may be adapted such that, in addition to performance of the trained ML model, the complexity of the information that relates the intermediate signals of the ML model to the ML model inputs and/or ML model outputs may also be considered as a criterion for the sum the trained ML model is suitable for being deployed to one of the controllers. In this manner, only trained ML models that have high performance while complying with an interpretability criterion can be output.

For illustration, topological characteristics of a decision boundaries (such as the number of unconnected parts of which a decision boundary is composed when the routing the decision boundary as a function of the three real-valued intermediate signals) may be used as an interpretability criterion.

It will be appreciated that the dependence of the intermediate signals on the ML model inputs and the dependence of the ML model outputs on the intermediate signals is not a priority known. Rather, this dependence is a result of the supervised machine learning.

During operation of a power generation, distribution, or transmission network, the controllers 31, 32, 33 may execute the decision logic deployed thereon. One or several of the controllers 31, 32, 33 may process signals (such as currents, voltages, or quantities derived therefrom in the time domain or frequency domain), using that decision logic, to determine if and when a circuit breaker trip is to be performed. It will be appreciated that other control actions may be performed, depending on the desired use of the controller 31, 32, 33.

Figure 2:
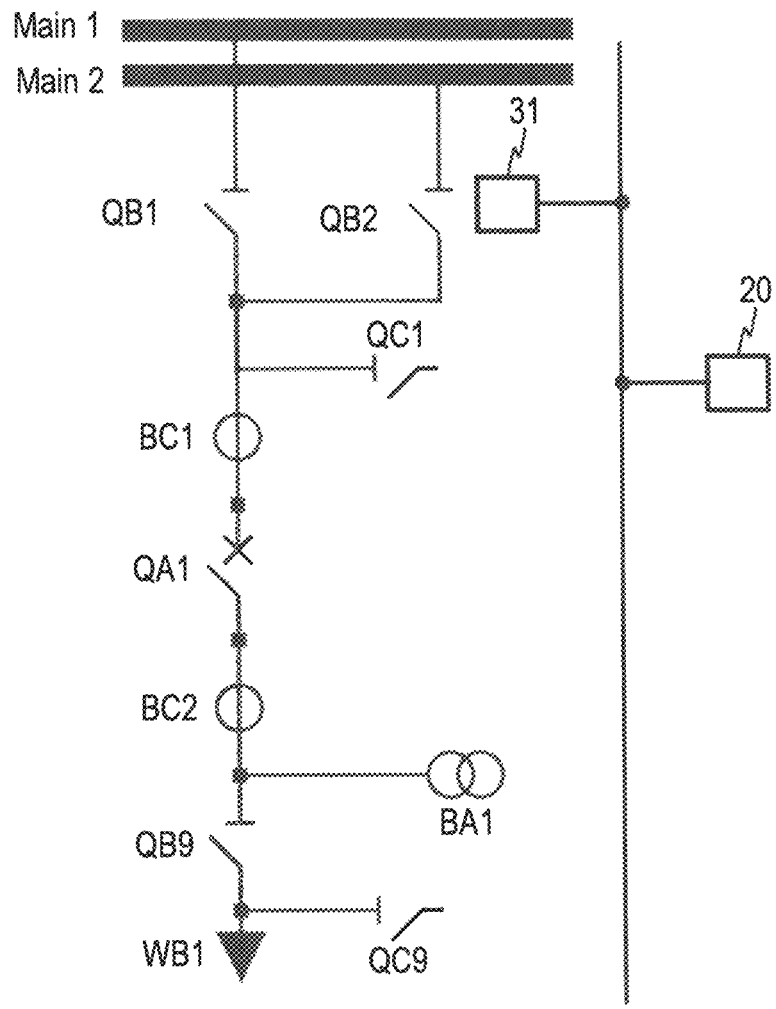
FIG. 2 is a schematic representation of a system.

Optionally, the controllers 31, 32, 33 may provide operational data to the protection logic generator 20. The operational data may be used for performing a performance assessment and/or for storing in the data storage device 23. When labeled, this data can be used in future training FIG. 2 is a schematic diagram illustrating a decision logic generator 20 and a controller 31 executing the decision logic automatically generated by the decision logic generator 20, used in conjunction with components of a power distribution or generation system. For illustration, a bay of a power substation may include switches QB1, QB2, QC2, AQ1, QB9, and QC9, transformers BC1, BC2 for current sensing and transformers BA1 for voltage sensing. Sensor devices are deployed to generate raw signals that may be provided, optionally via a merging unit or other unit, to the controller 31.

The decision logic generator 20 is adapted to automatically generate and optionally automatically deploy the decision logic that is performed by the controller 31, as described in more detail herein.

The ML model may receive currents and voltages as raw signals in the time of frequency domain. This applies both to supervised machine learning (when the decision logic is generated by the decision logic generator 20) and operation of the decision logic in the respective controller 31, 32, 33.

Optionally, pre-processing may be performed. For illustration, in addition to, or instead of, raw voltage and current measurement, the machine learning model can rely on different types of input signals, depending on the type of protection which is sought (e.g. distance relaying, (under/over) frequency relaying etc.). The source of input signals does not need to be limited to local instrumentation but can be wide-area instrumentation as well as a central SCADA. This applies both to supervised machine learning and operation of the decision logic in the respective controller 31, 32, 33.

Figure 3:
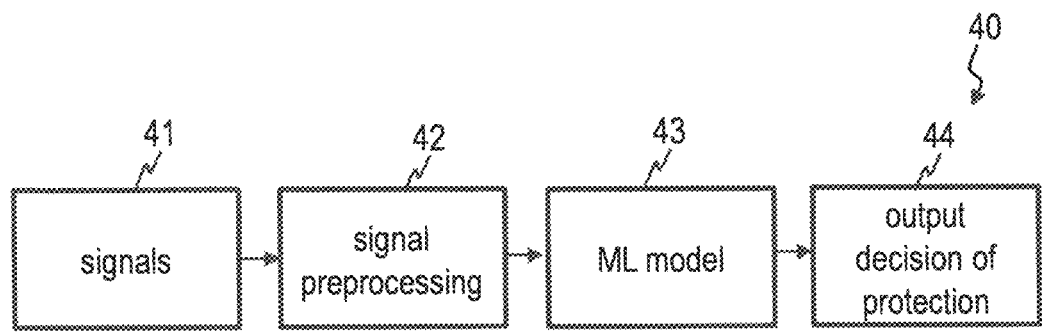
FIG. 3 is signal flow chart.

FIG. 3 illustrates an exemplary signal flow 40. Raw signals 41 may be processed by a signal pre-processing module 42. The outputs of the signal pre-processing module 42 may be, e.g., impedances, conductances, susceptances, admittances, or other derived quantities. These signals may respectively be determined for each one of the three phases. These signals may respectively be complex-valued (i.e., having an amplitude and an argument or phase in the complex plane). The ML model 43 generates an output 44, which may be a decision on which control action is to be performed.

As explained above, the ML model 43 is decomposed into several computational sub-processes. This aids the interpretation of the decision logic that is being executed.

A potential, non-exhaustive list of signals that can be used as ML model inputs and that can be generated in the pre-processing by the signal pre-processing 42 are as follows (where in particular any complex quantity may be given by Cartesian or polar representation):

1. phase currents, I, and voltages, V, raw signals, phasors, sequence components, superimposed quantities or wavelet decompositions
2. phase impedances, Z, sequence components or fault type specific impedances calculated based on current and voltages phasors,
3. phase admittances, Y, sequence components or fault type specific admittances calculated based on current and voltages phasors
4. phase apparent powers, sequence component apparent powers, calculated based on current and voltages phasors
5. frequency spectrum of voltage and current signals using short-term Fourier or discrete wavelet transformation. This time-frequency analysis could be performed on voltage and current signals following a modal transformation.
6. Voltage and current signals transformation by Clarke or dq0 transform.
7. Custom digital filter where the filter coefficients are delivered by data driven ML algorithm.
8. information from adjacent substations as well as from wider area such as frequency measurements, data from WAMS, demand and generation status, (topological) connectivity, most-recent state estimation results from EMS/SCADA, meteorological data such as humidity, temperature etc.

At least some of the above listed quantities that can be determined by the pre-processing in the feature computation 42 may be computed based on a sliding window or moving average over raw signals (voltages, currents). Phasor computation can be performed by standard sine, cosine FIR filters with the length of single full cycle of fundamental frequency or by using half cycle filters or any other custom tuned filter weights or custom filter length.

In addition or as an alternative to these and other features at a certain point in time, their short-term dynamics (e.g. an estimate of their derivative, or signals from a sliding time window) may be used as ML model input.

Thus, the ML model can be preceded by a signal pre-processing module which converts the raw voltage and current measurements to the ML model inputs (input features, such as estimated impedances) which are appropriate for the classification, as illustrated in FIG. 3. An aspect of the invention describes how to automatically identify which (combination of) candidate inputs should be selected, such that protection performance is maximized while ensuring interpretability, as will be explained in more detail with reference to FIG. 24. Note that, the raw measurements (such as current and voltage signals for each of three phases) can also be directly fed to the ML model.

Generally, the inputs to the ML model that is being trained by the decision logic generator 20 and the inputs to the trained ML model that is deployed as decision logic in the controllers 31, 32, 33 can be time-dependent. In other words, these ML model inputs can be trajectories of signals over time. An instance of input signals is also referred to as a signal vector trajectory herein. The term "signal vector trajectory" reflects both that it is a trajectory ranging over some time period, and that there is a vector of signals at each point in time. This type of data is also referred to as temporal data or time-dynamical data. For example, a set of temporal data may consist of the computed line impedances over a certain time period (e.g., the last 500 ms). The task of learning from temporal data is referred to as a dynamical learning task.

A proposed structure of an ML model which acts as a classifier, as well as the way of training that classifier, which operates on static inputs (i.e. only single time snapshots of signal vectors) will be described first. For example, a static data point at a given moment may consist of the computed line impedances at that moment (computation which takes place in the "signal pre-processing" module 42 and is performed by using sampled measurements over a time period). The task of learning from static data is referred to as a static learning task. After describing the proposed ideas as static learning task adaptations that cover the case of dynamical learning tasks as well will be described.

The proposed ML models are computational graphs, as they consist of flows of computations. While the techniques disclosed herein are applicable to time dynamical computational graphs (as will be explained in more detail with reference to FIGS. 19 to 21), and architecture of a static computational graph will be discussed first. It will be appreciated that the proposed ML model in the protection relay 31, 32, 33 will be receiving the signal vector one by one over time and compute an output one by one over time accordingly, in a continuous manner. In machine learning terminology this is referred to as online (as opposed to batch) computation.

Figure 4:
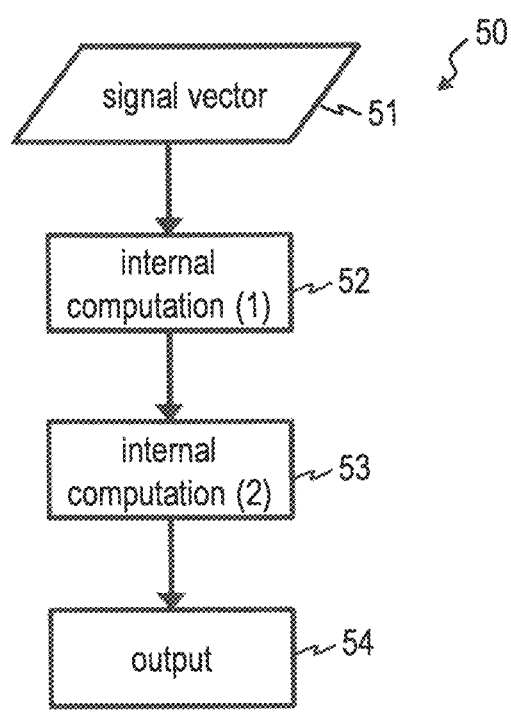
FIG. 4 is a static computational graph.

FIG. 4 is a static computational graph 50. A signal vector of 51 is received at a time step. The decision logic of the protection relay or the controller performs internal computations 52, 53 to generate an output 54. As will be explained in more detail below, the internal computations 52, 53 are generated by performing supervised machine learning. The internal computations 52, 53 may each involve an artificial neural network that strained during the supervised machine learning. Alternatively, only one of the internal computations or only some of the internal computations may involve an artificial neural network or another machine learning structure.

A decision logic (i.e., the trained ML model) is automatically generated using supervised machine learning. This is preferably done in such a way that the generated decision logic is explainable/interpretable by a human. In a conventional complex computational graph (or Artificial Neural Network), this is virtually never the case.

In order to achieve interpretability, the internal computations of the ML model are decomposed into steps which can be visualized in 2D or 3D. That is, the computational flow contains low-dimensional checkpoints (typically 2- or 3-dimensional), such that the learned mappings
  between the checkpoints and/or
  between the ML model inputs and one of the checkpoints and/or
  between one of the checkpoints into the ML model outputs
can be fully visualized via the UI 27 and can be interpreted and checked by a human By keeping the number of these internal computations sub processes low (e.g. two or three sub-processes), a human engineer can inspect the sequence of these steps for any interesting ML model input and analyze the way the decision is obtained. This facilitates validation of the decision logic. For illustration, a human engineer can verify whether the trained decision logic operates according to the specifications and/or expectations. Additionally or alternatively, decisions on whether a decision logic must be revised when changes in the power generation, distribution or transmission system take effect can be facilitated. The generation of an alternative decision logic that is to be executed after a modification is take effect in the power system is facilitated.

Figure 5:
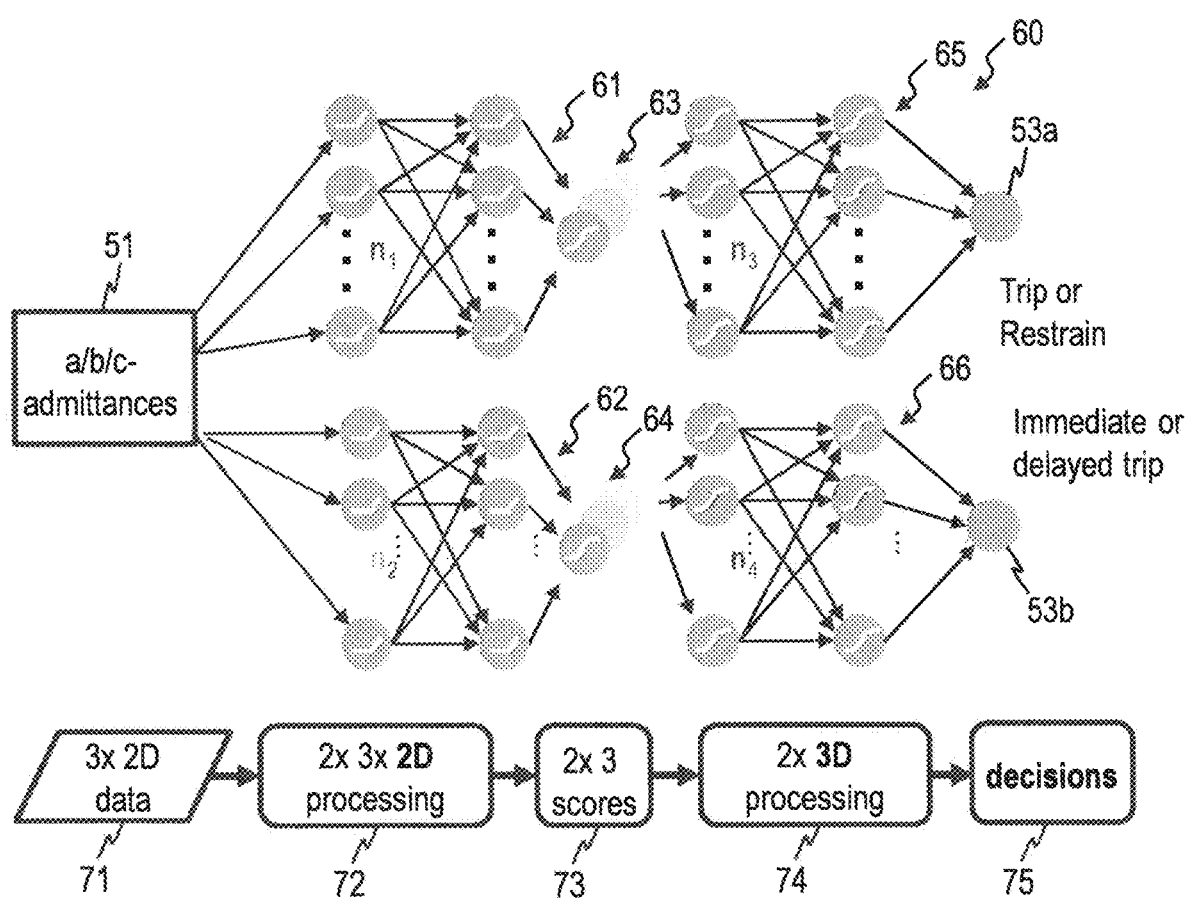
FIG. 5 shows a computational graph.
Figure 6:
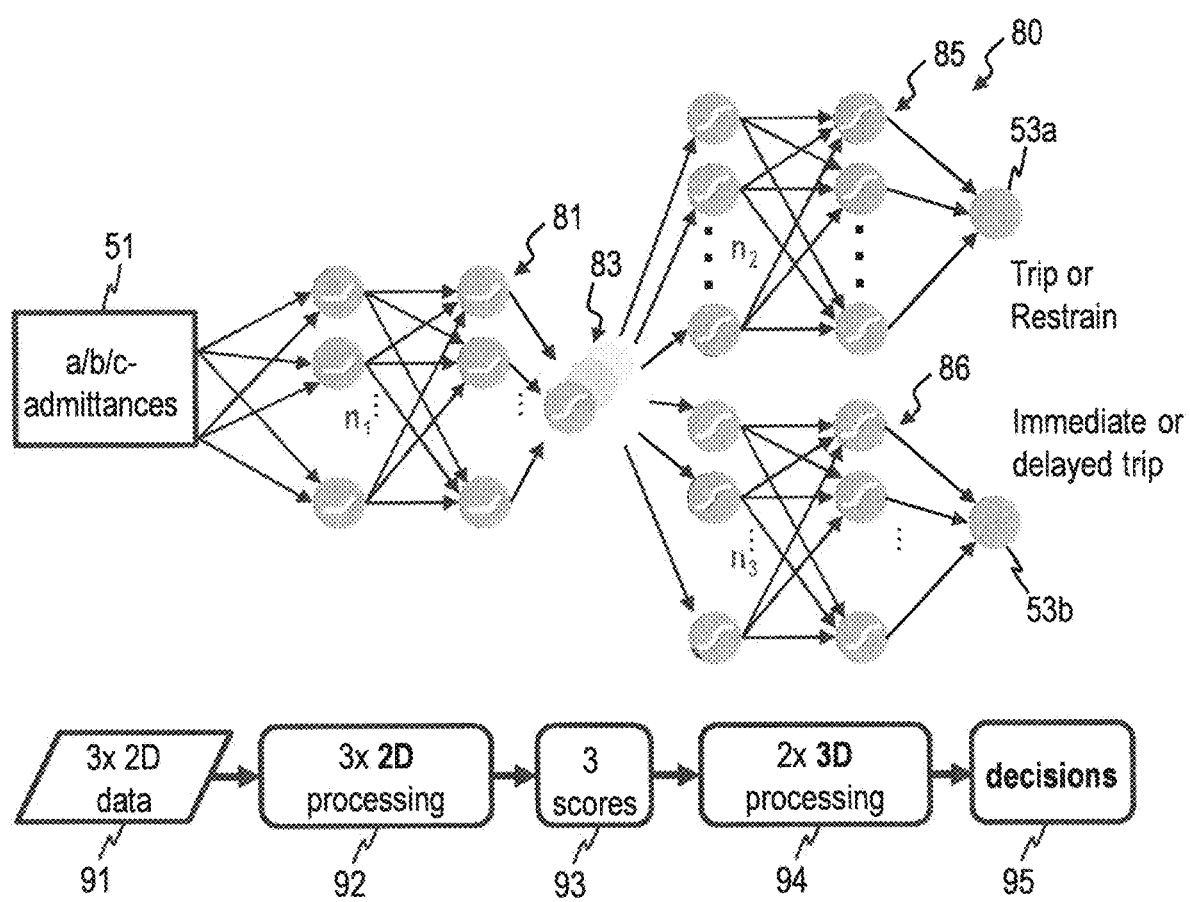
FIG. 6 shows a computational graph

FIGS. 5 and 6 illustrate exemplary ML models 60, 80. The ML models receive three complex numbers or six real numbers as inputs. It will be appreciated that this is the input at a given time step. The ML models provide binary outputs 53a, 53b which can indicate which one of several control actions is to be taken.

As illustrated in FIG. 5, the ML model inputs are provided to one first artificial neural network 61, which outputs intermediate signals 63. The intermediate signals 63 may be three or less than three real-valued numbers (which will also be referred to as scores herein). The intermediate signals 63 are input into a consecutive second artificial neural network 65. The consecutive second artificial neural network 65 provides an output 53a, which may indicate whether a circuit breaker trip or circuit breaker restrain action is to be taken.

The ML model inputs are provided to another first artificial neural network 62, which outputs intermediate signals 64. The intermediate signals 64 may be three or less than three real-valued numbers (which will also be referred to as scores herein). The intermediate signals 64 are input into another consecutive second artificial neural network 66. The consecutive second artificial neural network 6 provides an output 53b, which may indicate whether a circuit breaker trip, if any, is an immediate or delayed trip.

Thus, as illustrated in FIG. 5, three complex signals (which may be represented by six real signals in Cartesian or polar representations) are received as input data 71. The two parallel first artificial neural network 61, 62 perform processing 72 (which amounts to two times processing three complex signals) to generate two sets of three real signals 62, 64 each. The two parallel second artificial neural networks 65, 66 perform processing 74 (which amounts to two times processing three real signals) to generate decisions 75, which may be binary decisions.

As illustrated in FIG. 6, the ML model inputs are provided to a first artificial neural network 81, which outputs intermediate signals 83. The intermediate signals 83 may be three or less than three real-valued numbers (which will also be referred to as scores herein).

The intermediate signals 83 are input into a consecutive second artificial neural network 85. The consecutive second artificial neural network 65 provides an output 53a, which may indicate whether a circuit breaker trip or circuit breaker restrain action is to be taken.

The intermediate signals 83 are also input into a consecutive second artificial neural network 86. The consecutive second artificial neural network 86 provides an output 53a, which may indicate whether a circuit breaker trip, if any, is an immediate or delayed trip.

Thus, as illustrated in FIG. 6, three complex signals (which may be represented by six real signals in Cartesian or polar representations) are received as input data 91. The first artificial neural network 81 performs processing 72 (which amounts to processing three complex signals) to generate one set of three real signals 93. The two parallel second artificial neural networks 85, 86 perform processing 94 (which amounts to two times processing three real signals) to generate decisions 75, which may be binary decisions.

The activation functions in the graph nodes of the computational graph can be realized as feed-forward ANNs with nonlinear activation, e.g. ReLU, sigmoid/tan h, or any other nonlinear function. They can comprise a variable number of hidden layers of arbitrary sizes ($n_1$, $n_2$, $n_3$, $n_4$). A different number of hidden units per layer is possible.

As a more specific example, the ML model of FIG. 5 and FIG. 6 will be explained for a case where the inputs to the ML model are static signal vectors consisting of the estimated 3-phase admittances of a line, which is monitored by a relay. That is, the input signal vector consists of a complex number (i.e. having a real and an imaginary part) per phase, resulting in a size of six numeric inputs. Interpretability of the decision logic is achieved in two steps:

1. All three complex quantities (i.e. all 3-phase admittances) are processed to compute three scalar quantities, also called scores. This is achieved by one or more functions mapping a complex number (2D) to a scalar (1D). These three scores constitute a low-dimensional checkpoint (3D). The three scores may be real-valued scalars.
2. The ML model output (i.e. the trip/not trip decision) is obtained from the three aforementioned scores. This is achieved by a function mapping 3D to 1D.

FIG. 5 illustrates a first variant implementing the above-described steps, and FIG. 6 illustrates a second variant. In both cases, the computational graphs assume the inputs to be 3 complex quantities and the output to be one of three possible decisions of the protection logic: "restrain", "trip with delay", or "trip immediately". These three decisions are separated by means of two binary classifiers, one separating "restrain" from "trip", and one separating "trip immediately" from "trip with delay". Instead of using two cascaded binary classifiers, a single 3-class classifier could be alternatively used (e.g., implemented via a softmax output layer). The choice of the classifier can depend on and can be driven by whether the output remains interpretable.

Each of the two decision steps, the 2D processing and the 3D processing, consists of a standard feed-forward computational graphs. "2D processing" can refer to a computation that takes a 2D input and produces a scalar output, namely it takes a single complex input feature, such as admittance and computes a score. "3D processing" can refer the computation that takes a 3D input, namely the scores, and computes the classification output.

In one implementation, each binary classifier can depend on its own input scores 63, 64, computed by dedicated sub-graphs 61, 62, as illustrated in FIG. 5. In order to reduce the number of parameters which need to be tuned, and also to enhance interpretability, a joint 2D stream architecture as shown in FIG. 6 is preferred, where the 2D processing is shared between both 3D classifiers (the two cascaded binary classifiers introduced above).

As mentioned above, the activation functions in the graph nodes of the computational graph can be realized as feed-forward ANNs with nonlinear activation, e.g. ReLU, sigmoid/tan h, or any other nonlinear function. They can comprise a variable number of hidden layers of arbitrary sizes ($n_1$, $n_2$, $n_3$, $n_4$). A different number of hidden units per layer is possible, as illustrated in FIGS. 5 and 6. Since binary classification tasks are learned, the activation of the output unit is typically but not necessarily sigmoid. As mentioned, multi-class classification with softmax or any other activation may be used in other embodiments as well.

An implicit consequence of the training process (where the objective is to train ML model as accurately as possible) is that the learning system will learn the intermediate scores such that they carry the highest value for correctly making the right decision. When the ML model is learned, this fact will crucially facilitate interpretability of the scores.

From the perspective of the machine learning process, the intermediate checkpoints, i.e., the real-valued scores 63, 64, 83 do not have a physical meaning. They rather function as a way to compress physical data to a valuable metric for decision-making As will be appreciated from FIGS. 5 and 6, the ML model may be specifically designed in such a way that a number of, e.g., at most three intermediate signals is provided at an intermediate stage of the processing in the ML model, thereby artificially constraining the number of variables at that point in the computational flow.

For a general time-dynamic set-up, the way in which ML model inputs associated with different times are input into ANNs (or other classifiers) may depend on the type of decision logic that is to be generated. For illustration, for a first type of decision logic, a grouping of signals by signal type may be used, while a grouping by time may be used for a second type of decision logic.

Grouping by time may be implemented in such a way that signals that relate to the same time but have different signal type (e.g., direct voltage, direct current, q current, zero current) are supplied to the same artificial neural network or other classifier or computational sub-process. A first set of signals having different signal types but relating to the same first time (e.g., direct voltage, direct current, q current, zero current at the first time) may be supplied to a first ANN, classifier, or computational sub-process. A second set of signals having these different signal types but relating to the same second time (e.g., direct voltage, direct current, q current, zero current at the second time) that is different from the first time may be supplied to a second ANN, classifier, or computational sub-process. The second ANN may have the same number of layers and nodes as the first ANN, but may have weights that are determined independently of those for the first ANN. This concept may be extended to more than two times.

Grouping by signal type may be implemented in such a way that signals that have the same signal type (e.g., one of: direct voltage, direct current, q current, zero current) but relate to different times (such as direct voltages measured at first, second, third and fourth times) are supplied to the same artificial neural network or other classifier or computational sub-process. A first set of signals having the same signal type but relating to different times (such as direct voltages measured at first, second, third and fourth times) may be supplied to a first ANN, classifier, or computational sub-process. A second set of signals having a different signal type but relating to the same times (such as direct currents measured at first, second, third and fourth times) may be supplied to a second ANN, classifier, or computational sub-process. The second ANN may have the same number of layers and nodes as the first ANN, but may have weights that are determined independently of those for the first ANN. This concept may be extended to more than two signal types.

Figure 7:
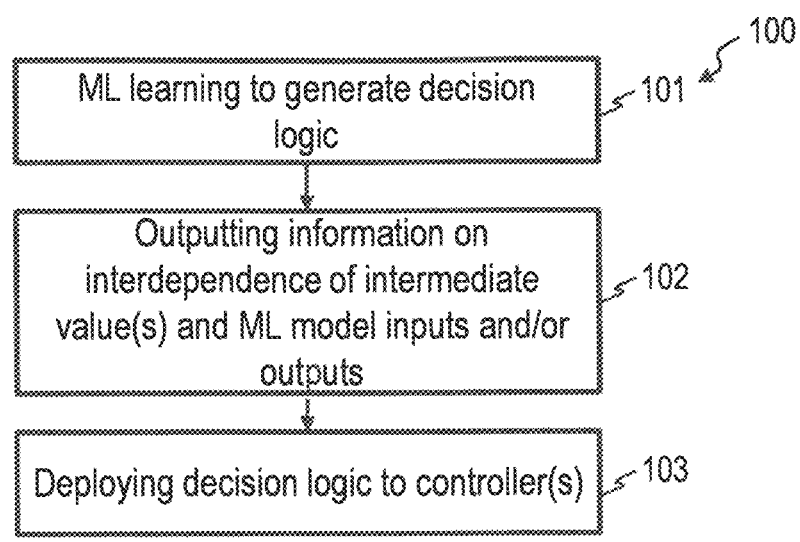
FIG. 7 is flow chart of a method.

FIG. 7 is a flow chart of a method 100 according to an embodiment. The method 100 may be automatically performed by the decision logic generator 20.

At step 101, supervised machine learning is executed to generate the decision logic. This is done by training a ML model or several ML models. In several ML models are trained, they may be evaluated, after training, with regard to performance and, optionally, with regard on their interpretability.

At step 102, information on one or several of the sub-processes of the ML model is output. The information may include one or several of the following:

information on how inputs of the trained ML model, which is intended to be used as decision logic, are processed into the intermediate signals at the checkpoint(s), information on how the intermediate signals at the checkpoint(s) are processed into the possible control actions, i.e., the outputs of the controller, and if several checkpoints are provided, how the trained machine learning model processes the intermediate signals at one of the checkpoints into intermediate signals at the consecutive checkpoint.

This information may be output via a graphical user interface or other optical output device.

At step 103, they decision logic (i.e., the trained ML model) can be deployed to a controller. It will be appreciated the different decision logics will be deployed to different controllers. The decision logic may respectively be a protection logic.

FIGS. 8 to 11 illustrate operation of the method and of the decision logic generator 20 according to embodiments for a case in which an admittance, $Y=G+jB=1/Z$, respectively for each of the faces is used as ML model input. Here, Y denotes the admittance, G denotes the conductance, B denotes the susceptance, j denotes the imaginary unit, and Z denotes the impedance. It is assumed that three real-valued scores are computed by a first computational sub-process, as illustrated, e.g., in FIG. 6. It is further assumed, that the ML model acts as a classifier which can output decisions on circuit breaker restrain, immediate circuit breaker trip, or delayed circuit breaker trip.

Figure 8:
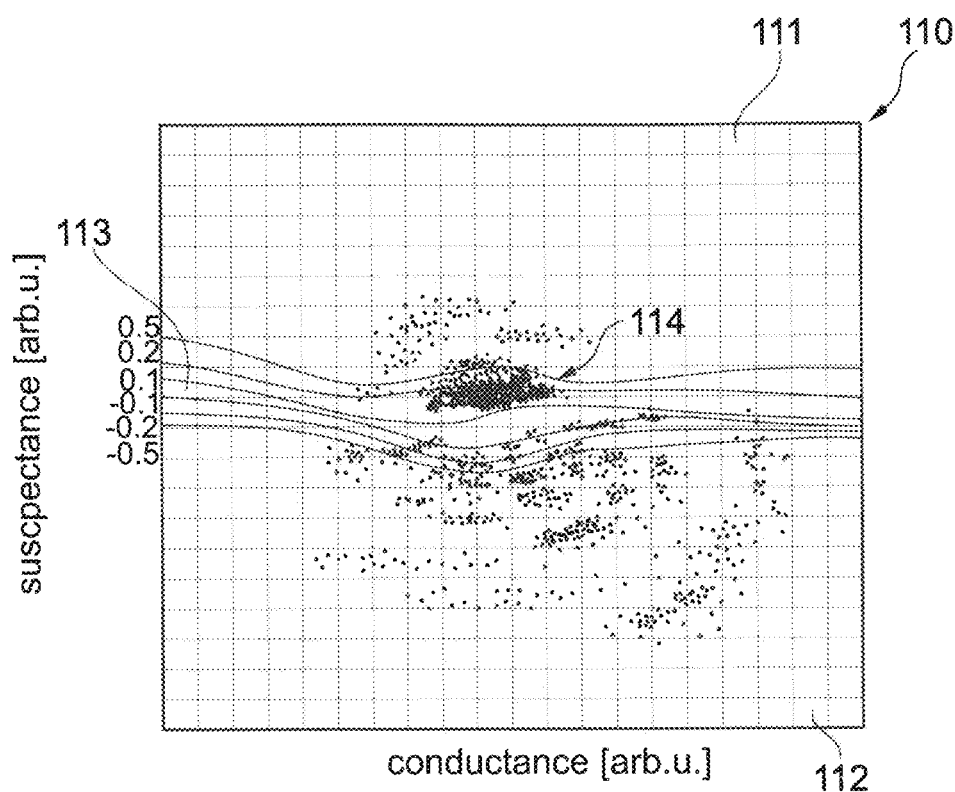
FIGS. 8 and 9 show intermediate signals as a function of phase susceptance and conductance.
Figure 9:
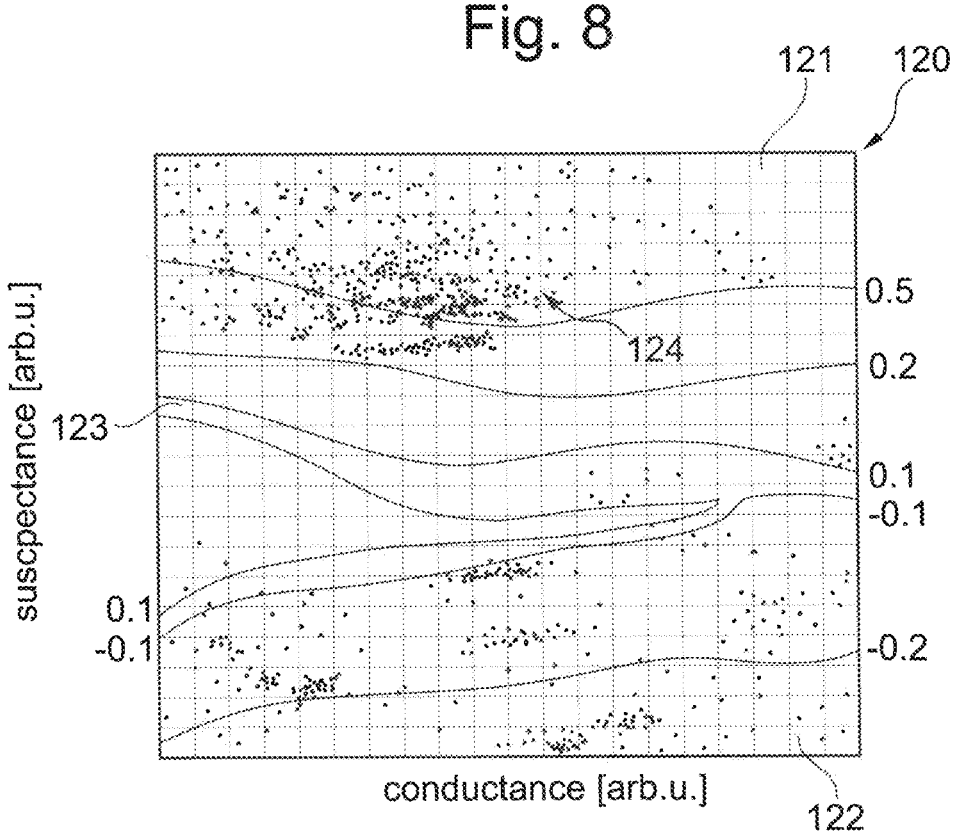

FIGS. 8 and 9 illustrate graphics that show the dependence of one of the three real-valued intermediate signals (i.e., scores) on the conductance and susceptance of the admittance of one of the phases. These graphics illustrate the operation of the first computational sub-process 81 and FIG. 6.

The score is illustrated by iso-score lines for scores −0.5, −0.2, −0.1, 0.1, 0.2, and 0.5. A region 111, 121 where the score is close to a maximum signal of +1 is separated by a region 113, 123 where the score is close to a minimum signal of minus −1 by a region 113, 123 where the score is close to zero. Each of the dots 114, 124 represents training data.

Graphics 110, 120 depicting the dependence of an intermediate signal on the ML model inputs may be generated in the output to the user. As previously noted, the intermediate signals or scores do generally not have the direct physical interpretation. Still, the graphics of FIGS. 8 and 9, when supplemented by the graphics that will be described with reference to FIGS. 10 and 11, allow the human engineer in to understand the decision logic that is generated by the supervised machine learning.

Figure 10:
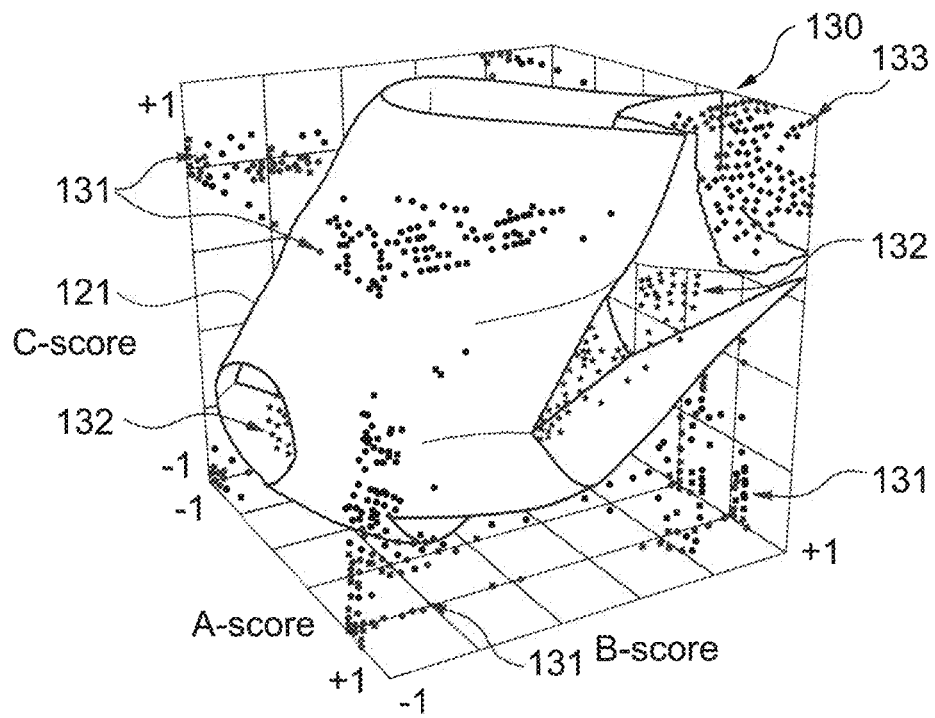
FIGS. 10 and 11 show three-dimensional graphics representing decision boundaries as a function of the intermediate signals.
Figure 11:
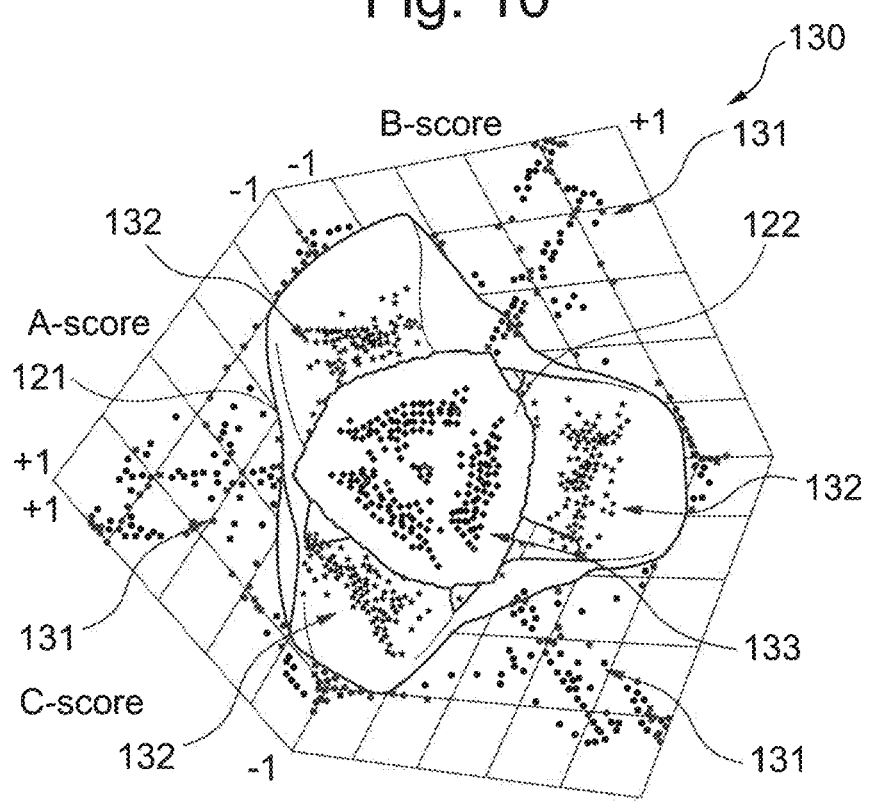

FIGS. 10 and 11 illustrate graphics that show the dependence of the decision boundaries on the three real-valued intermediate signals (i.e., scores). These graphics illustrate the operation of the second computational sub-processes 85, 86 and FIG. 6. FIGS. 10 and 11 show that decision boundaries from different perspectives, respectively as a function of the three real-valued intermediate signals (i.e., scores). These decision boundaries are obtained by training the ML model.

One decision boundary 122 separates circuit breaker restrain and trip decisions. In other decision boundary 121 separates immediate trip and delayed trip decisions.

Training data 133 represents restrain, training data 131 represents immediate trip, and training data 132 represents delayed trip.

It will be appreciated that the specific manner in which the ML model is designed, and in which a number of real-valued outputs of a first computational sub-process is limited to, e.g., three or less than three, that are then further processed by another sub-process of the ML model allows the decision boundaries to be visualized in 2-D or 3 D.

The decision logic generator 20 and/or the user interface 27 may be adapted such that the graphics representing the decision boundaries in dependence on the three real-valued intermediate signals (i.e. scores) can be rotated by a user input. This further assist the human expert engineer to assess the way in which the decision logic operates.

It will be appreciated that both graphics representing the dependence of the intermediate signals (i.e., scores) on the ML model inputs after training and the dependence of the ML model outputs on the intermediate signals (i.e., scores) may be generated and output. This information may be used by a human expert engineer to validate and/or interpret the decision logic that is deployed to and executed by a controller.

Figure 14:
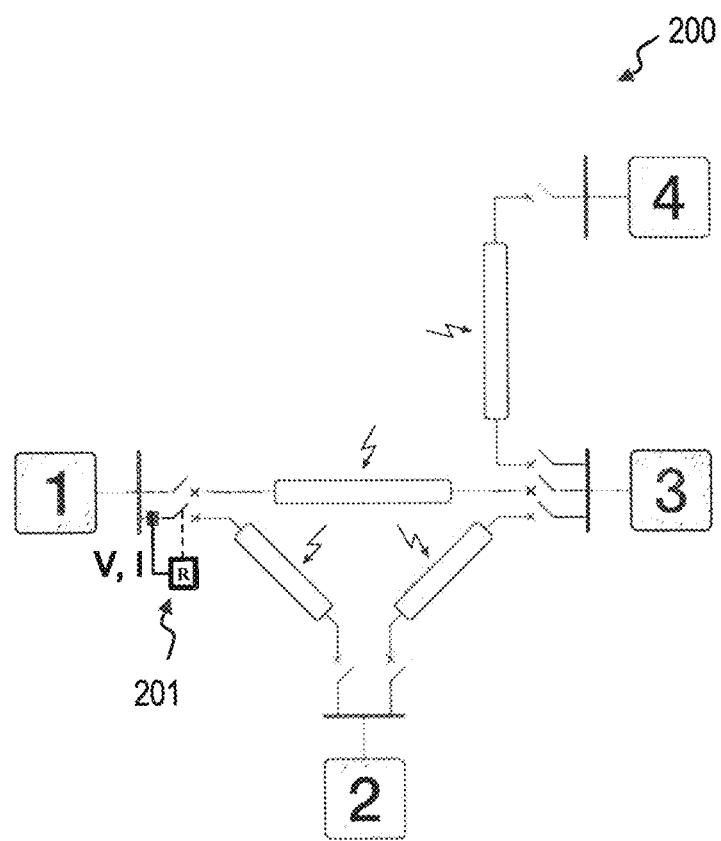
FIG. 14 is a schematic representation of a system.

The graphics illustrated in FIGS. 8 to 11 are obtained by simulating a system as schematically shown in FIG. 14. The protection relay 201 processes voltage and/or current signals.

The decision logic generator 20 generates interpretable protection logic for the relay 201 for the sake of simplicity, only faults in lines 1-2 and 1-3 have been simulated. For those two lines, all types of faults were simulated for a few representative loading conditions, fault locations, fault inception angles and fault resistances. Faults in line 1-3 correspond to "restrain" relay decisions, faults up to 80% of line 1-2 (zone 1) correspond to "trip immediately" decisions, while faults beyond the 80% of line 1-2 (zone 2) correspond to "trip with delay" decisions. Note that this is not a protection design example, but rather a reduced use-case to further illustrate the operation of the methods and systems according to embodiments.

Figure 12:
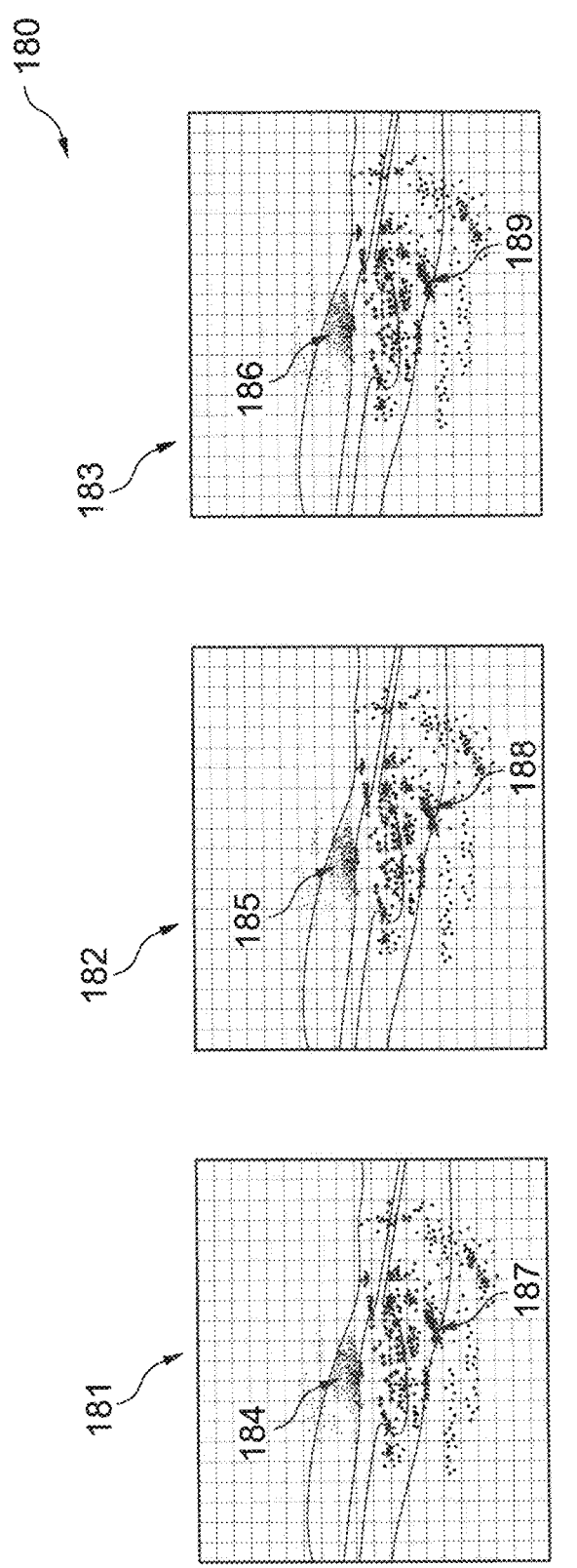
FIGS. 12 and 13 show intermediate signals as a function of phase susceptance and conductance.

As explained above, the ML model consists of two sub-graphs: First, one score per phase is computed, based on the phase admittance as monitored by the relay, resulting in three scores, and subsequently, the final decision (i.e. the ML output) is computed based on all these three scores. FIG. 8 visualizes the mapping of admittance to score (per phase; the full picture for all three phases is given in FIG. 12), and FIGS. 10 and 11 illustrate the mapping of the scores to decision. The test cases which were used for training the ML model are also shown in these plots as dots. The same scoring function can be used for each phase, as shown in FIG. 12. Therefore, the three plots in FIG. 12 (which represent the scoring function for the different phases) look very similar. In FIGS. 8, 9, and 12, iso-score lines with the same score are indicated by lines. In the graphs 181, 182, 183, regions with positive score are located above the region with score having magnitude of less than 0.1, marked by the centermost pair of iso-score lines, and regions with negative score are located below the region with low score, as has been explained above. However, any selected dot (i.e. a simulated case of the simulation data 184-189; different decisions are indicated by different symbols in FIG. 12) on one of the graphs 181, 182, 183 will, in general, correspond to another location the other graphs.

This visualization can be used by the expert engineer. The human engineer can thereby approve of the decision logic for deployment. Interpretability of the trained ML logic can be assessed automatically, in addition or as an alternative to assessment by a human engineer.

The combination of scores allows the second sub-graph to make the distinction as shown in FIGS. 10 and 11. One can observe that the scoring function makes a very sharp separation in most of the admittance plane based on the admittance angle, taking signals close to +1 and −1 at either side, while it takes signals close to zero within a region where the admittance is low (i.e. impedance is high) resulting in a less sharp separation. As seen in FIGS. 10 and 11, this region allows one to identify the zone 2 faults ("trip with delay"). The combination of the three scores allows one to distinguish between trip and restrain decisions.

Figure 13:
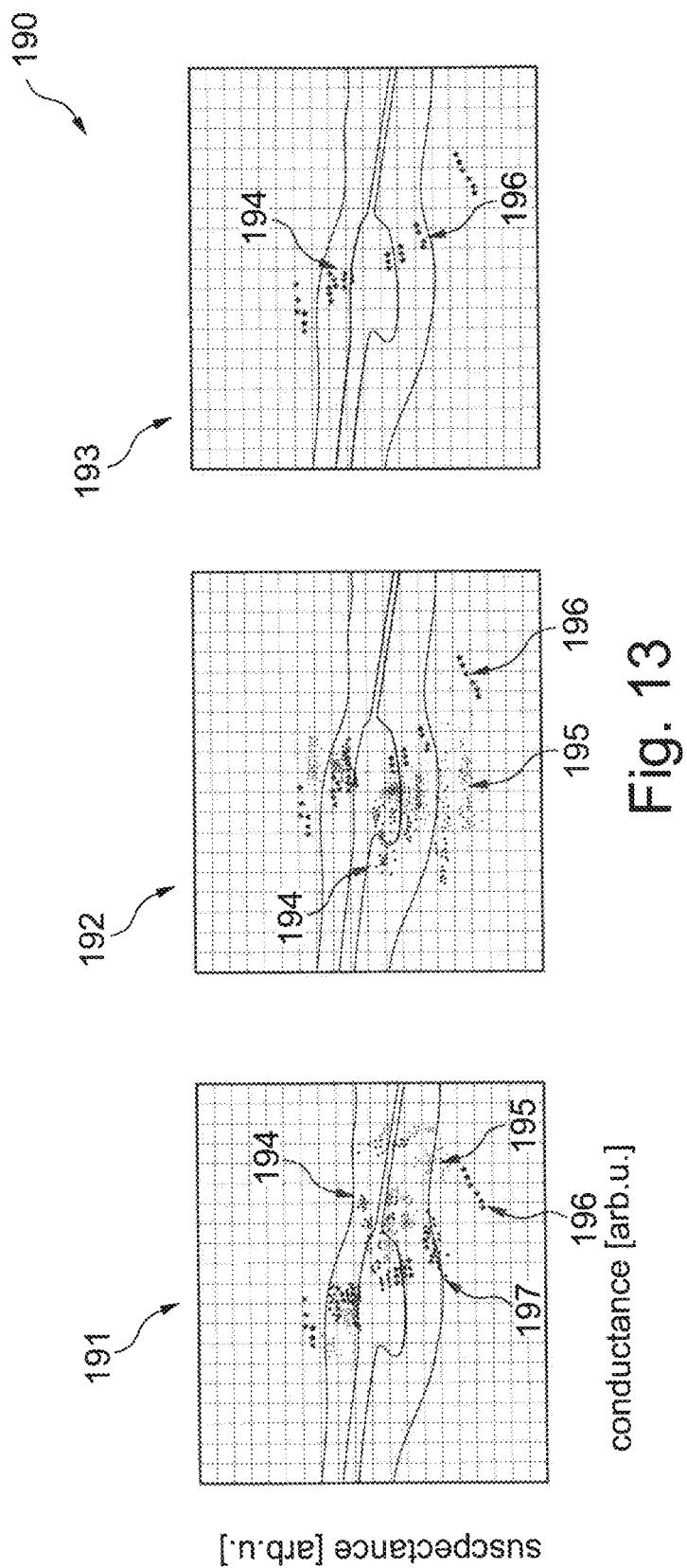

For further illustration, let us focus on a subset of faults, involving only phase A (namely A-G, A-B, A-B-G, A-B-C). The score functions are plotted in FIG. 13. For example, an A-B fault with admittance angle close to zero (corresponding to certain system loading conditions) would receive a Score A equal to +1, a score C equal to +1 and a Score B equal to −1 (see straight arrows 194 in FIG. 12), allowing for the second sub-graph to classify it as a "trip immediately" case (see FIGS. 10 and 11). FIG. 12 also shows the training data 195 for faults from phases A-B to ground, the training data 196 for A-B-C faults, and the training data 197 for faults from A to ground.

The preceding paragraphs illustrated a specific case only, based on 3-phase admittances as inputs. In similar ways, it is possible to generate interpretable computational graphs that take different signals as input, e.g. impedances etc., or raw signals like voltages and currents. This would possibly lead to a different number and/or dimensionality of the checkpoints.

It will be appreciated that graphics representing the dependence of the ML model outputs on the intermediate signals (i.e., scores) may be generated and output, preferably in addition to graphics illustrating the dependence of the intermediate signals (i.e., scores) on the ML model inputs after training. This information may be used by a human expert engineer to validate and/or interpret the decision logic that is deployed to and executed by a controller.

The concepts disclosed herein generally are particularly useful to training ML models when the number of ML model inputs is less than a threshold, such as ten real-valued scalars or six or less real-valued scalars. The greater the number of ML model inputs necessary to learn a certain task for a desired performance level, the more challenging it is to design an interpretable computational graph. For any given task, the question of whether a learning model with the desired properties (performance level, interpretability) exists can be answered empirically, as it is inherent to machine learning applications.

One preferred approach of this invention is to keep the number of input dimensions as low as possible, in order to facilitate interpretability, while keeping the performance of the learned classifier very high. A way of selecting a set of ML model inputs with as low-dimension as possible during the learning phase of the ML model will be described with reference to FIG. 24.

The proposed computational graphs may also contain parts which are not subject to learning. For illustration, after computing a set of scores, the computational graph may apply the operator of taking the maximum to the scores, which, for instance, corresponds to the intuition of choosing the "worst" of the scores.

While it is preferable to have low-dimensional checkpoints (i.e., a number of real valued intermediate signals of the ML model that is two or three) to facilitate the generation of interpretable graphics for outputting via the UI 27, that techniques disclosed herein not limited thereto. For illustration, if there are more than three real valued intermediate signals output by a first sub process 61, 62, 81 and input into a second sub process 65, 66, 85, 86, graphics representing the operation of the trained ML model may still be generated. For illustration, any one of the following techniques can be used:

Projection on linear lower-dimensional sub-spaces and visualization

Projection on nonlinear lower-dimensional sub-spaces (manifolds) and visualization Analysis of properties of the low-dimensional mappings, such as gradients, variation, minima/maxima, monotonicity along lower dimensional manifolds, etc.

It will be appreciated that the projection on to lower dimensional subspaces for visualization may be a linear or nonlinear projection. The projection may involve integration along a straight line or a curved line in a space having more than three dimensions.

While it is preferably to artificially constrain the number of intermediate signals to two or three real-valued variables and to keep the total number of ML model inputs rather small, the techniques described herein are not limited thereto. For illustration, if the results of computational sub-processes are combined in a linear way, a human expert can understand the operation of the decision logic even when the number of intermediate signals is greater than three. Plural graphics representative of the various logical sub-processes may be output. For illustration, as shown in FIG. 5, by specifying the ML model to be trained in such a way that it includes two binary classifiers, the operation of each of the two classifiers (e.g., "trip" or "restrain" as result of a first classifier, "immediate trip" or "trip with delay" as result of a second classifier) can be considered and evaluated separately by the engineer.

The process of training a ML model may be repeated iteratively. This may be done to improve performance and/or to ensure that the output information on the trained ML model is readily understandable by a human expert. The ML model may be modified between successive iterations.

Figure 15:
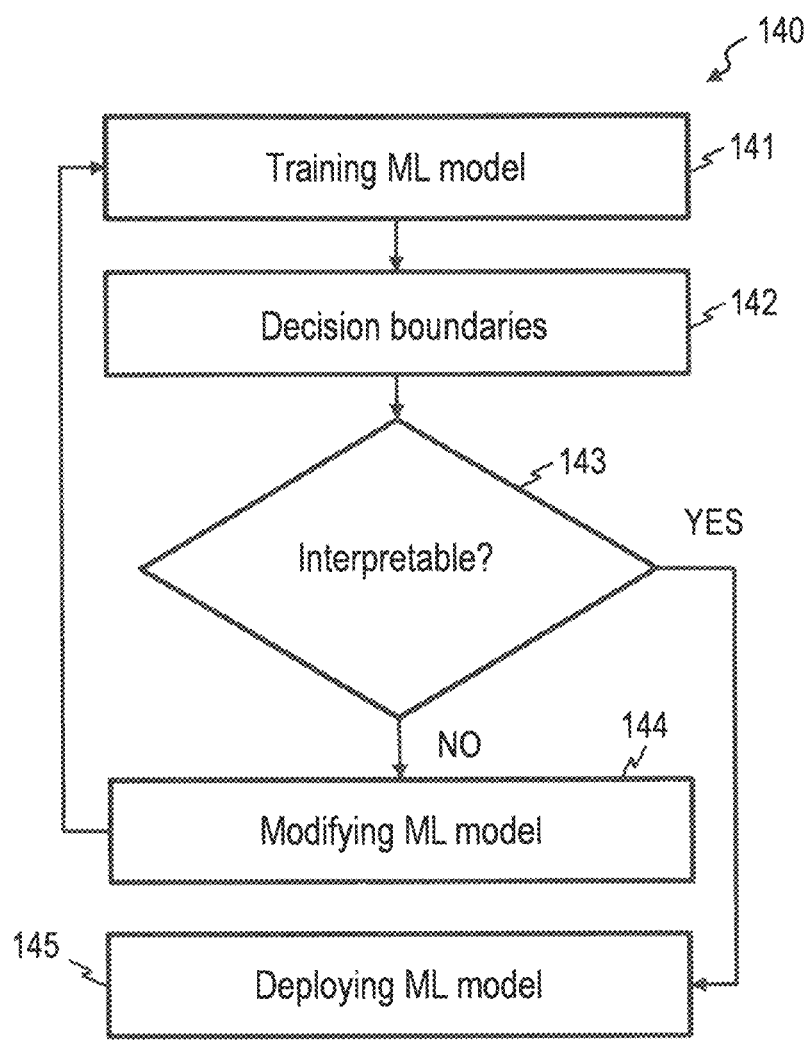
FIG. 15 is flow chart of a method.

FIG. 15 is a flow chart of a method 140. The method 140 may be performed automatically by the decision logic generator 20.

At step 141, supervised machine learning is performed to train the ML model.

At step 142, decision boundaries are determined. The decision boundaries may be determined in dependence on the real valued intermediate signals (i.e., scores).

At step 143, it is determined whether the decision boundaries, then output via a user interface, are sufficiently simple in order for the trained ML model to be considered interpretable. While user input may be used at step 143, step 143 may be implemented completely or at least partially automatically. For illustration, topological characteristics of the decision boundaries may be determined in order to assess whether the trained ML model is regarded to be interpretable. For illustration rather than limitation, the number of disjoint surfaces representing a decision boundary in the three-dimensional space spanned by three real valued scores can be determined and compared to a threshold signal to assess whether trained ML model meets a criterion (such as being interpretable by a human) Other topological characteristics of the decision boundary, such as gradients and/or curvatures in three-dimensional space spanned by three real valued scores, may also be used.

At step 144, if the trained ML model is considered to be not interpretable (in the sense that the output information is too complex), the ML model may be modified. This may be done using a variety of techniques, as will be explained in more detail with reference to FIG. 18.

At step 145, if the trained ML model is considered to be interpretable, the ML model may be deployed as decision logic to a controller, such as a digital protection relay.

Figure 16:
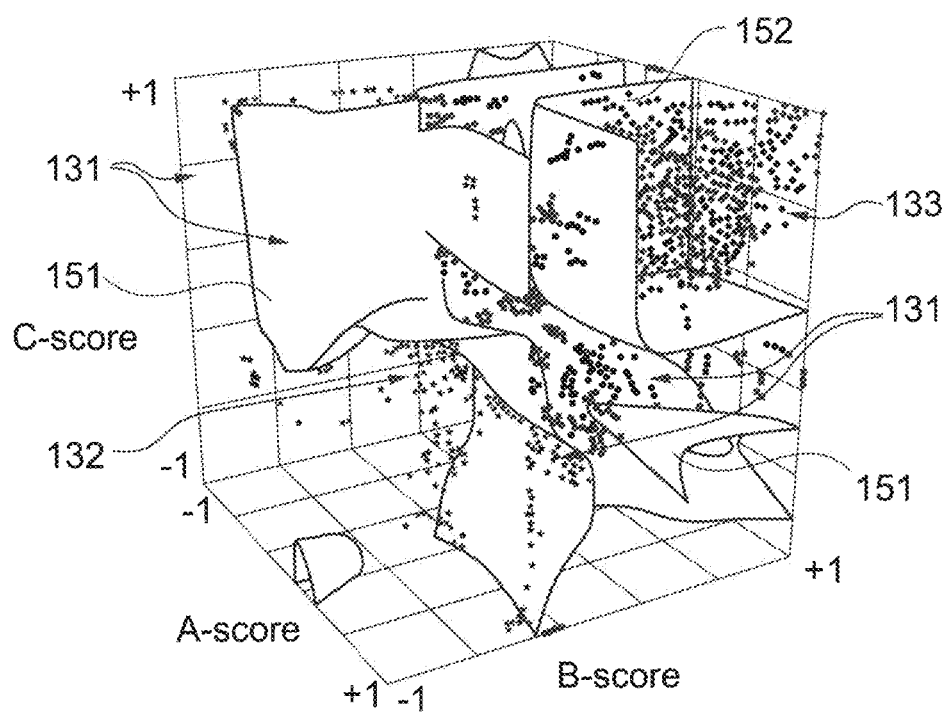
FIGS. 16 and 17 show three-dimensional graphics representing decision boundaries as a function of the intermediate signals.

A static computational graph with low-dimensional checkpoints learned in one shot may already satisfy the requirements in terms of interpretability. However, there are cases where the functions learned in this first shot are too complex or convoluted. FIG. 16, which builds upon the example presented with reference to FIGS. 8 to 14, shows a case in which one of the decision functions learned in the second part of the computational graph is very convoluted and is therefore hardly interpretable.

In order to increase interpretability, the parts of the ML model which are considered to be too difficult to understand, i.e. non-interpretable, are replaced by simpler models which allow interpretability, e.g. by means of visualization as already discussed. This is a learning in stages approach, since the task of learning the final ML model is not performed in a single run, but in iterations.

Figure 18:
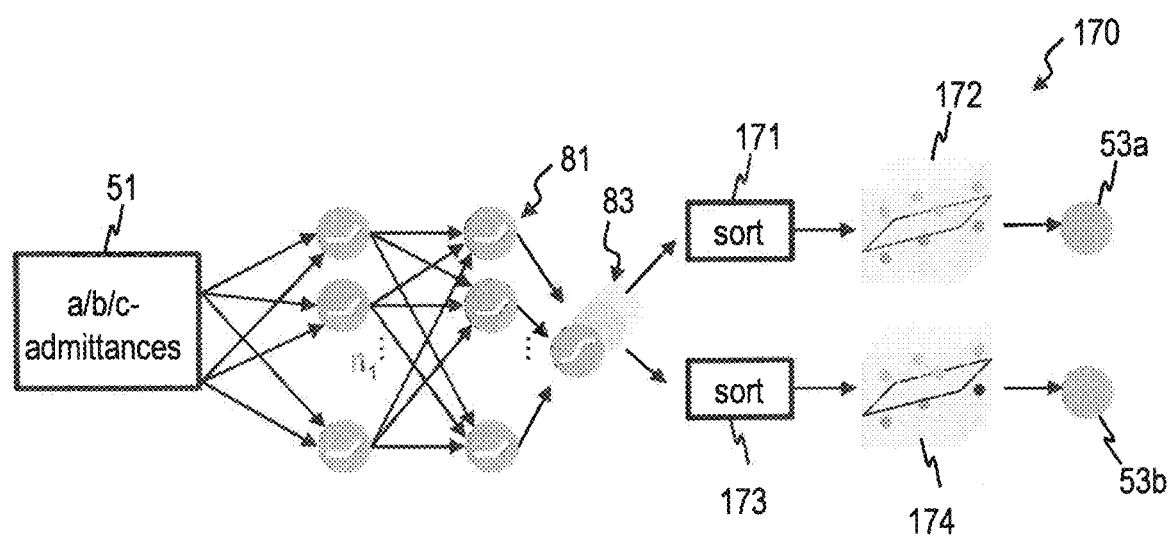
FIG. 18 shows a computational graph.

FIG. 18 visualizes the proposed idea. The new simpler model can again be a machine learning model, such as an ANN or a support vector machine (SVM), with a structure which ensures a lower complexity (e.g. shallower ANN, SVM with linear or nonlinear kernel function etc.) Note that for each sub-graph (i.e., for the sub processes 61, 62, 81 on the one hand and the sub processes, 65, 66, 85, 86 on the other hand) reducing model complexity can require several iterations, where complexity is progressively reduced.

As illustrated in FIG. 16 the decision boundaries learned in the original computational graph, specifically in the two right-most sub-graphs, are too complex and shall be simplified. This applies in particular for a decision boundary 151 between immediate and delayed trip. Hence, the corresponding sub-graphs are removed from the ML model and replaced by different computations, as shown in FIG. 18, to thereby generate graphics that is more easily understandable, as shown in FIG. 17.

Figure 17:
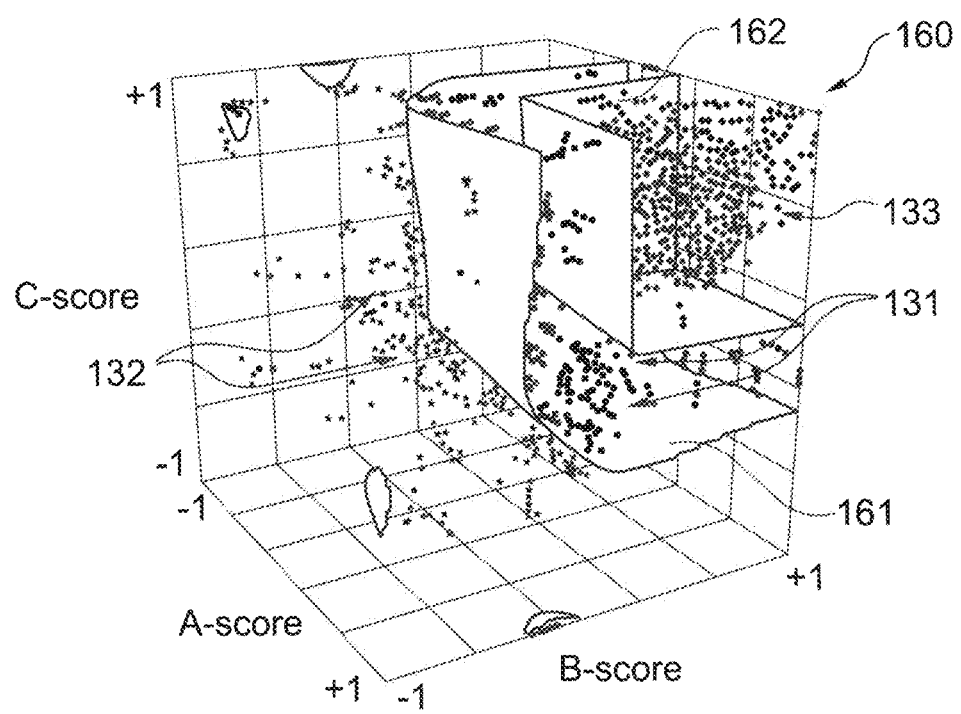

It will be appreciated that, in FIGS. 16 and 17, training data 133 represents restrain, training data 131 represents immediate trip, and training data 132 represents delayed trip. Both FIG. 16 and FIG. 17 show a decision boundary 162 that separates restrain from trip decisions. The other decision boundary 151, 161 separates immediate and delayed trip decisions. That decision boundary 151 is very complex.

Returning to FIG. 18, the sub-graphs 85, 86 that may each be ANNs may be replaced by sorting 171, 173 the 3 scores in increasing order followed by an SVM 172, 174.

The sorting 171, 173 is motivated by the fact that there is a desired symmetry property which can be enforced by modifying the computational graph: Since the ML model inputs are the 3-phase admittances, the classification output should not depend on the permutation of the inputs and hence of the scores, since a fault in any phase should cause the same behavior of the protection logic. This symmetry property can be enforced by sorting the 3 scores in increasing order, before feeding them to the SVM classification 172, 174. This symmetry applies to phase-related inputs, but would not apply to sequence components-related inputs.

It will be appreciated that sorting may not only be performed in increasing order, but also in decreasing order. Further, the sorting is also useful when inputs other than admittances of being used as ML model inputs. For illustration, when 3-phase impedances are used as ML model inputs, sorting may be performed to attain the same effect.

As there is no a-priori guarantee of achieving information that can be more easily interpreted, iterative techniques may be used to assess whether the complexity of the decision boundary, when drawn as a function of the three intermediate signals (i.e., scores) can be reduced. The range of available machine learning models is thereby a significantly enhanced. The chances that an interpretable trained ML model can be found are increased.

Training in stages as explained with reference to FIGS. 15 to 18 may not only be used to facilitate the validation of the trained ML model.

For illustration, alternatively or additionally, learning in stages may be used to afford replacement of learned sub-graphs with specific functions. For example, if the function represented by a sub-graph is determined, during visual inspection or when evaluated by the decision logic generator 20, to be close to a known linear or nonlinear function, then it can be approximated by the respective function and replaced accordingly in the computational graph. After this replacement step, the next iteration of the training is executed.

Training

Aspects relating to the training of the ML model will be described in the following.

The decision logic design process proposed in this invention is based on supervised machine learning: A training dataset 25 containing simulated signals and possibly historical field data $x_i$ and labels $y_j$ is used to train the ML model. Training here means utilizing tuning methods (such as stochastic gradient descent) in order to set the parameters of the ML model (e.g. the weights of the Neural Network) based on the training dataset.

Training Dataset

For each signal vector trajectory $x_i$ of the training data 25, the corresponding label $y_i$ indicates if a fault has happened during that trajectory, at which time the fault has happened, and the desired resulting decision of the protection logic (e g immediate trip, trip after a certain delay, or restrain) or some derivative of a decision (e.g. a probability distribution over decisions).

The training data (time-dynamical or static as mentioned above) can be obtained by simulating various events using a model of the specific transmission or distribution grid for which the protection logic is designed or models of a plurality of transmission or distribution grids of different topologies for which a protection function is designed.

A human designer can decide what simulations to perform in order to generate the appropriate training data to be used by the machine learning procedure. Alternatively, the data can be generated in an autonomous manner by software using adversarial or other methods.

Whenever relevant historical data are available (e.g. of events which have happened in the grid in the past), they can also be used to enhance the training data-set.

Training Process

The target ML model for that decision logic, which can take a signal vector trajectory as input and can output, during online operation, a decision trajectory, is not necessarily learned in a single training run, but possibly in iterations, in a so-called learning in stages.

If the static computational graph has more than one checkpoint, multiple stages of learning can be arranged in different order. For instance, in the first stage, the first sub-graph could be kept while the rest is discarded and re-built, or the first two sub-graphs could be kept, etc.

Learning the time-dynamical computational graph can be done in several different ways of complexity and accuracy as described with reference to FIGS. 19 to 21.

Figure 19:
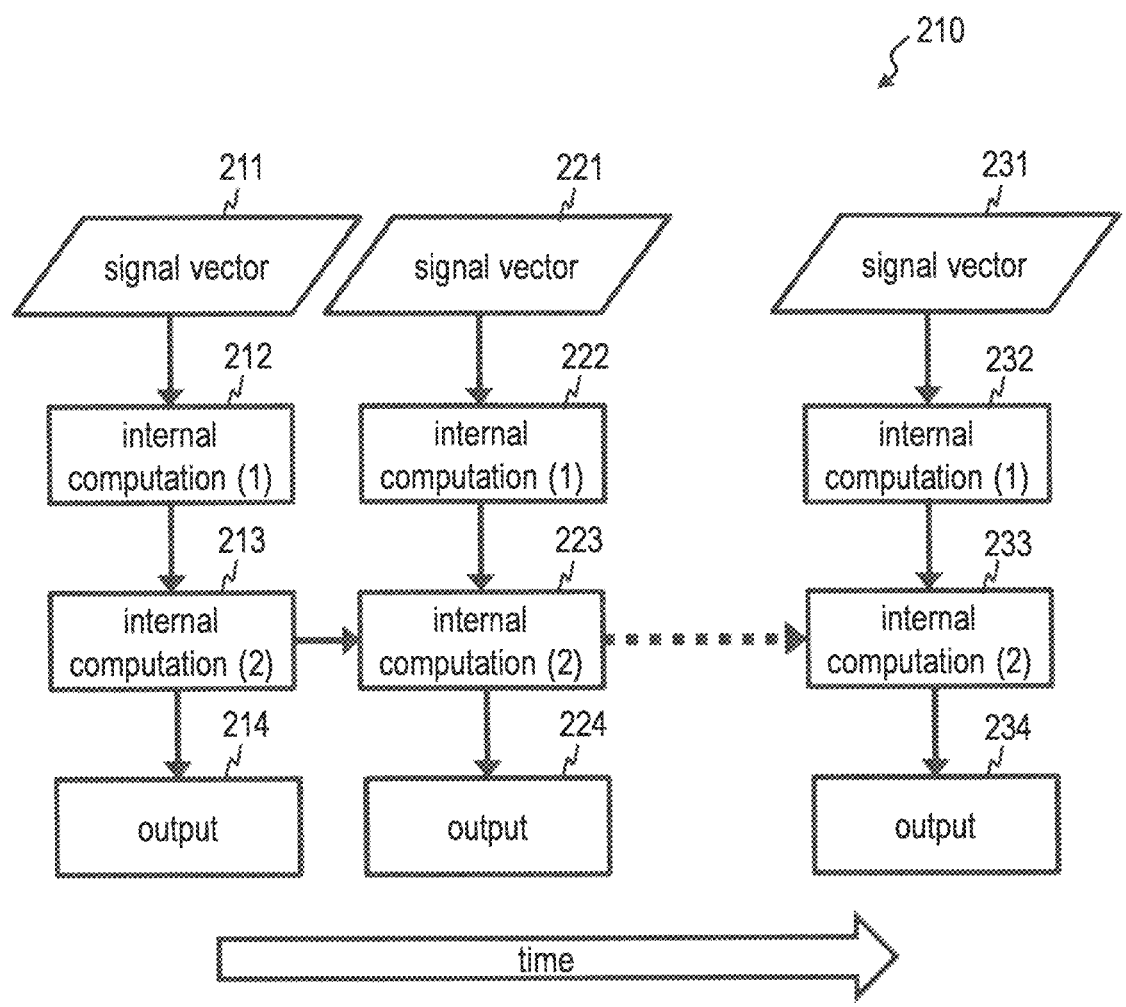
FIG. 19 is a dynamic computational graph.

FIG. 19 illustrates a time-dynamical computational graph 210. The ML model to learn, in order to perform protection logic decisions, may be such a time-dynamical computational graph as shown in FIG. 19, where the arrows represent data flow (typically numerical vectors) and the boxes 212, 213, 222, 223, 232, 233 represent computations. In a time-dynamical computational graph 210, the output 224, 234 depends not only on the current input 221, 231, but also on previous inputs, in contrast to a static computational graph (FIG. 4) which only maps the currently observed input to an output. A time-dynamical computational graph usually contains at least one internal state vector (e.g., the outputs of internal computations 213, 223) that carries the history over time. In FIG. 19, this is shown in the layer of "internal calculation (2)".

In operation, the decision logic of the controller (e.g., in the protection relay) is a ML model that receives the signal vector 211, 221, 231 one by one over time and computes an output 214, 224, 234 one by one over time accordingly, in a continuous manner. In machine learning terminology this is referred to as online (as opposed to batch) computation.

The proposed time-dynamical graph 210 consists of sub-graphs connected to each other. In order to serve as protection logic, the static ML model can thus be extended in order to operate in a time-dynamical setup. This can be achieved in a way to ensure that the robustness and the speed of the decision system are optimized, namely dependability, security and speed of the protection logic are either maximized or lower-bounded.

Since the measurements can contain sporadic bad data, static decisions are usually insufficient to make robust classification/decision.

The time-dynamical ML model of FIG. 19 is made up of a repetition of static ML models, one providing input to another. As compared to a static ML model (FIG. 4), the time-dynamical ML model 210 contains more sub-graphs. As a result, more low-dimensional checkpoints will typically need to be introduced in the computational graph, while more "sub-graphs" need to be replaced by lower complexity models by means of learning in stages (as explained with reference to FIGS. 15 to 18.

Interpretability of the final decision (e.g., immediate trip/no trip/delayed trip) of the ML model can be a relevant criterion for assessing whether the trained ML model can be deployed. In addition to the already described ways of achieving it (via visualization of sub-graphs and/or learning in stages), interpretability can also be enhanced by aggregating the individual outputs of the static sub-models over time which altogether constitute the time-dynamical model 210 by an interpretable function. For example, the aggregation could be performed in one of the following ways:

Low-pass filtering: The final decision is a low-pass filtered version of the static decisions output by 213, 223 to the subsequent static graph. Alternatively, any other filter (IIR filter, FIR filter, etc.) may be used.

Counting and thresholding: Static decisions (e.g. trip decisions at 214, 224, 234) are counted. The dynamic decision is a trip if a certain number of static trip decisions has been counted in a row.

While aggregation of plural sets of input signals is attractive for time-varying inputs, the above techniques may also be used in other cases in which plural sets of input signals are provided to the ML model as inputs.

In the full dynamical computational graph, the intermediate static outputs (e.g. the outputs of the first internal computation 213) may be relaxed to be continuous decision scores instead of categorical decisions. The second internal computation 223 can be used to store information on counting and thresholding, or to implement a low-pass filter as described before. This allows for a decision based on the aggregated "internal computation (1)" 212, 222 of the static model as it parses real-time incoming data. This way outliers and errors can be smoothened out, and a more robust decision can be established.

Various techniques can be used to train a ML model represented by the time-dynamic computational graph of FIG. 19:

i. The training data 25 may include time-series data. The time-series data may be used for simultaneously learning the static part and the dynamic part of the computational graph. The static part here represents the part of the graph until "internal computation (1)" 212, 222, 232, and the dynamic part represents the part of the graph named "internal computation (2)" 213, 223, 233. Existing state-of-the-art frameworks allow for this computation utilizing various learning algorithms (e.g. gradient descent with sub-gradient methods). This enables in particular relaxing the intermediate static outputs provided to the computations 223, 233 etc. to be decision scores instead of hard decisions. This also enables keeping the static sub-graph subject to (fine-) tuning.

ii. Training independently the static part of the computational graph of the decision logic (possibly through learning in stages, as explained above). Once the static part is learned, the dynamic part, or aggregation layer (e.g. the "internal computations (2)" 213, 223, etc. in FIG. 19) can be tuned. This may be achieved by a very simple parameter tuning in many cases, in particular for a simple aggregation function.

iii. Learning independently the static part of the computational graph and using heuristic "expert knowledge"-based aggregation for the dynamic part without learning (e.g. trip if the static decision has been to trip for a number of consecutive time steps). In this case, the learning process for the decision logic needs only static data.

It will be appreciated that, for options i and ii, supervised machine learning may be used for the static part of the graph (i.e., the computational sub-process 212, 222, 232 that does not carry data from one time step to the next time step) and the dynamic part of the graph (i.e., the computational sub-process 213, 223, 233 that carries data from one time step to the next time step).

The structure of this approach allows most of the tuning/learning steps described herein to be performed in one of the state-of-the-art frameworks for manipulating computational graphs (usually by stochastic gradient descent), such as (but not limited to) Tensorflow, PyTorch, Caffe, or MXNet. These frameworks also allow computationally efficient handling of very large computational graphs, such as dynamical graphs over many time steps. It is however not necessary to resort to such frameworks: all learning described here can be performed by well-known algorithms such as parameter sweeps or gradient descent.

Parts of the learned ML model will be what is commonly referred to as an "Artificial Neural Network" (ANN), and can be obtained ("trained") by employing the corresponding state-of-the-art methods (such as stochastic gradient descent). However, as explained above, the decision logic may contain parts which are obtained in different ways, e.g. support vector machines.

Figure 20:
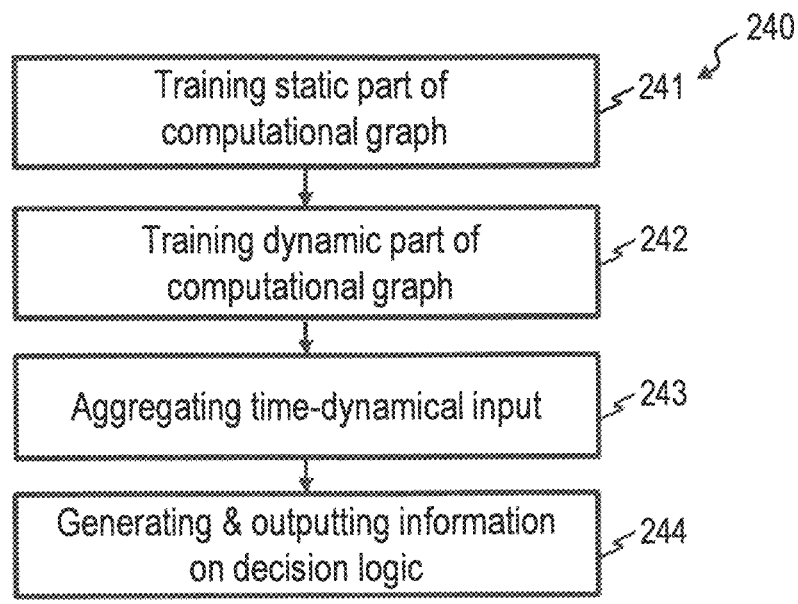
FIGS. 20 to 24 are flow charts of various methods.

FIG. 20 is a flow chart of a method 240 according to an embodiment. The method 240 may be performed automatically by the decision logic generator 20.

At step 241, a static part of a computational graph (i.e., a part that does not convey data from one time step to another time step) is trained using labeled data. The labeled data is time series data.

At step 242, a dynamical part of a computational graph (i.e., a part that carries data from one time step to another time steps) is trained using the labeled data. The labeled data is time series data.

At step 243, time dynamical input may be aggregated in order to facilitate visualization. This may be done in various ways. For illustration, low-pass filtering, IIR filtering, or FIR filtering may be used. It will be appreciated that this aggregation reduces the number of input parameters that is used for visualization, verification, or other interpretation of the trained ML model.

At step 244, information on the trained ML model that is to be used as decision logic is generated and output. The information that is generated and output may include one or several graphs representing the interdependence between the aggregated inputs determined at step 243 and the intermediate signals of the internal computations performed by the ML model.

Figure 21:
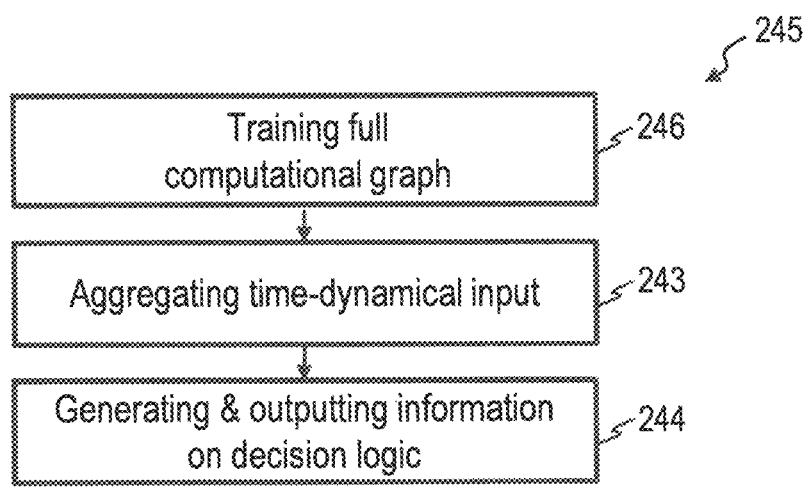

FIG. 21 is a flow chart of a method 245 according to an embodiment. The method 245 may be performed automatically by the decision logic generator 20.

At step 246, the ML model represented by the time-dynamical computational graph is trained using the labeled data. The labeled data is time series data. This may be done using frameworks for manipulating computational graphs (e.g., by stochastic gradient descent), such as (but not limited to) Tensorflow, PyTorch, Caffe, or MXNet.

At step 247, time dynamical input may be aggregated in order to facilitate visualization. This may be done in various ways. For illustration, low-pass filtering, IIR filtering, or FIR filtering may be used. It will be appreciated that this aggregation reduces the number of input parameters that is used for visualization, verification, or other interpretation of the trained ML model.

At step 248, information on the trained ML model that is to be used as decision logic is generated and output. The information that is generated and output may include one or several graphs representing the interdependence between the aggregated inputs determined at step 247 and the intermediate signals of the internal computations performed by the ML model.

The techniques for generating a decision logic for execution by a controller of a power generation, distribution or transmission system described herein take into account the performance of the trained ML model. A trained ML model is deployed as decision logic only if it has sufficient performance. However, other criteria may be used then deciding on whether a trained ML model is suitable for being deployed as decision logic. For illustration, the ML models described herein are specifically set up in such a way that they lend themselves to easy verification, inspection, checking, validation or other review by a human expert. To this end, low-dimensional checkpoints are introduced into the computational flow by defining sub-processes and enforcing the number of intermediate signals handed over from one subject process to another sub-process to be small (e.g., two or three). The interpretability of the result and trained ML model may be used as another criterion for determining with the trained ML model the suitable for being deployed as decision logic to a controller.

Figure 22:
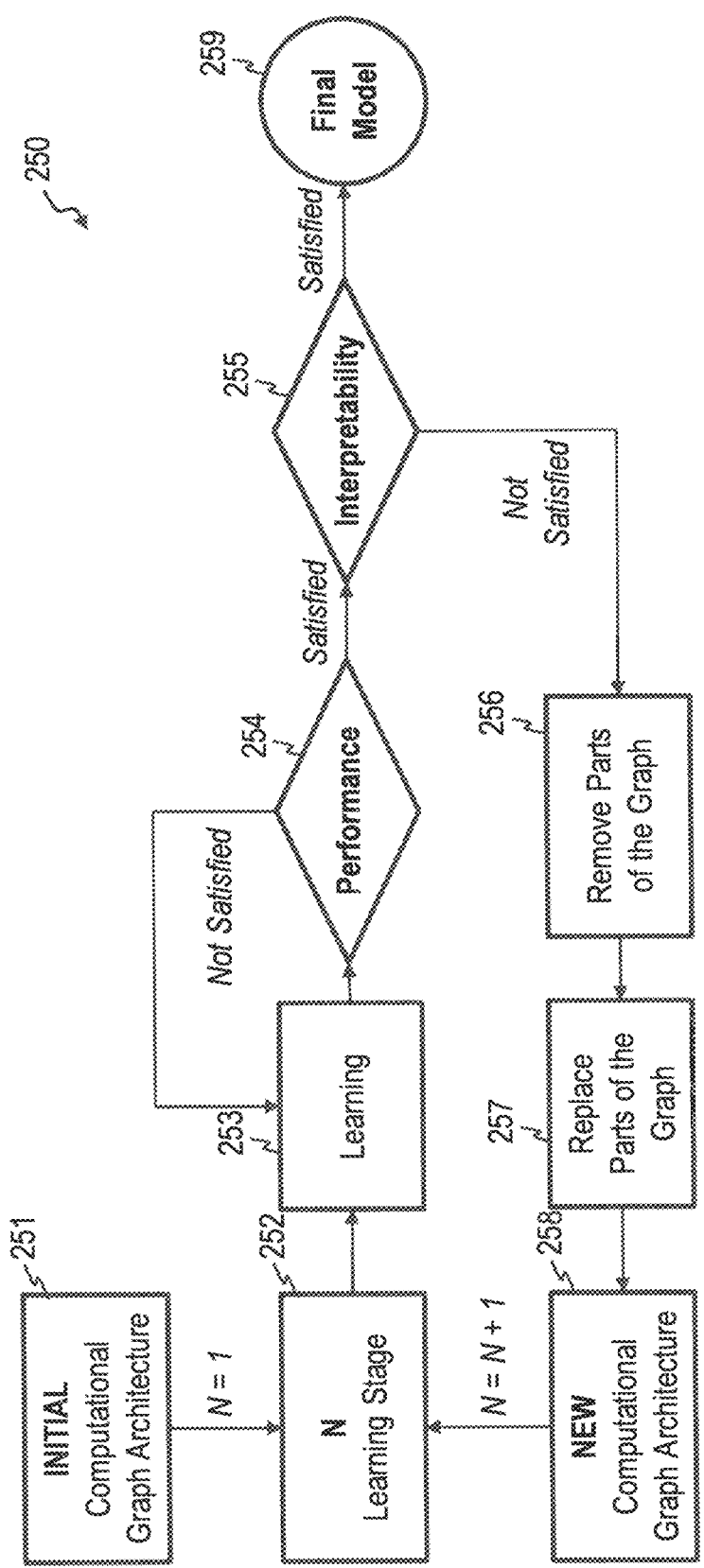

FIG. 22 is a flow chart of a method 250 according to an embodiment. The method 250 may be automatically performed by the decision logic generator 20. The method 250 is exemplary for a learning in stages approach.

At step 251, an initial computational graph architecture is selected and an iterative process is initiated. The initial computational graph architecture may include one or several artificial neural networks.

At step 252, the $N^{th}$ learning stage is started. In the first iteration, N=1.

At step 253, supervised machine learning is performed.

At step 254, it is determined whether a performance criterion is met. Verifying that the performance criterion is met may be based on test data that is not included in the labeled training data 25. If the performance criterion is not met, the method returns to step 253. If the performance criterion is met, the method proceeds to step 255.

It will be appreciated that assessing the performance can be implemented in various ways. For illustration, several tests scenarios not included in the training data may be supplied to the trained ML model, and the control logic generator 20 may determine whether the correct decision is taken on not. It will be appreciated that the test data is also labeled data, but is not included in the training data. The fraction of correct decisions and/or the performance of the decision logic for test scenarios that are particularly critical may be used to assess whether the performance criterion is met.

At step 255, other characteristics of the trained ML model may be evaluated in order to determine with the trained ML model is suitable for being deployed as decision logic to a controller.

In some examples, the interpretability of the trained ML model may be evaluated. This may be done in various ways. For illustration, graphics providing
- information on how inputs of the trained ML model, which is intended to be used as decision logic, are mapped into two or three real-valued, scalar intermediate signals at the checkpoint(s),
- information on how the intermediate signals at the checkpoint(s) are processed into the possible control actions, i.e., the outputs of the controller, and
- if several checkpoints are provided, how the trained machine learning model processes the intermediate signals at one of the checkpoints into intermediate signals at the consecutive checkpoint may be provided to a human engineer. Based on a response from the human engineer, it may be determined whether or not a criterion is fulfilled. While the interpretability may be assessed by using user input, the assessment of the interpretability at step 255 may be partially or fully automated. For illustration, topological characteristics of 2- or 3-dimensional graphs, which may represent a decision boundary in a space spanned by the intermediate signals, may be used to assess the interpretability of the trained ML model.

At step 256, if the ML model is considered not to be interpretable, parts of the computational graph used in iteration N may be removed.

At step 257, alternatively or additionally, parts of the computational graph may be replaced by another computational sub-process or a known function. For illustration, if his been explained above, if one of the computational sub-processes is deemed to be not interpretable, this part of the computational sub-process may be replaced by a support vector machine or another function.

At step 258, the resultant new computational graph architecture is used as a computational graph architecture in the sub sequent learning stage. The method returns to step 252.

If, at step 255, it is determined that the trained ML model does not only meet the performance criteria checked at step 254, but additionally also meets the criterion checked at step 255, the trained ML model may be output as decision logic at step 259.

Figure 23:
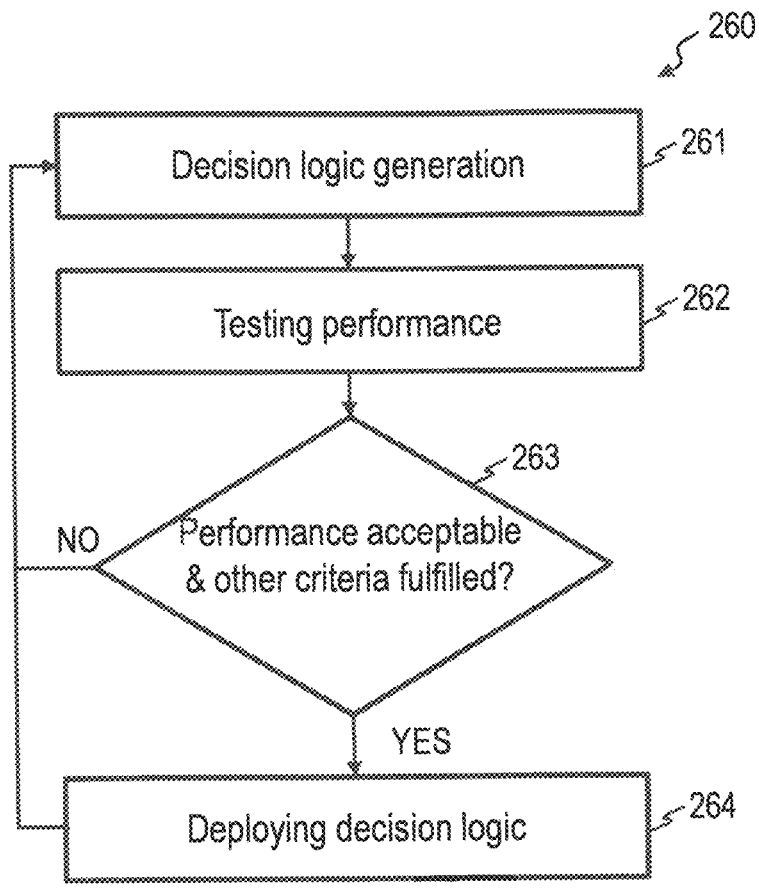

FIG. 23 is a flow chart of a simplified method 260. The method 260 may be performed automatically by the decision logic generator 20.

At step 261, supervised machine learning is executed to generate the decision logic.

At step 262, performance of the generated decision logic is tested. This may include simulating the behavior of the decision logic in response to test scenarios. The test scenarios may be based on historical data and/or data generated by simulation.

At step 263, it is determined whether the performance is considered to be acceptable and optional other criteria are met (e.g., if the decision logic results in decision boundaries that can be easily understood by a human engineer when output via the UI 27). If the performance is not acceptable or if other criteria are not met, the method returns to step 261. A new ML model may be selected for training for the next iteration.

If the performance is acceptable and the other criteria that may be checked at step 263 are met, at step 264 the decision logic may be deployed to the controller for execution.

It will be appreciated that various other criteria may be used to determine whether new iterations of ML are required. For illustration, if the electric power system in which the decision logic is to be executed by a controller has a symmetry (which often is the case for the three phases of the power system), the trained ML model may be automatically evaluated with respect to whether its behavior reflects this symmetry. E.g., it may be verified whether a cyclic permutation of ML model inputs associated with different phases also lead to the expected consistent decision logic behavior.

While user input may be used to receive feedback on the trained ML model, the methods and computer systems disclosed herein can be augmented with a module that automatically assesses a learned decision logic. This module can be again trained by means of machine learning.

It is generally desirable that the number of ML model inputs is kept small, to allow for the low-dimensional-checkpoint-based interpretability by means of visualization to be effective.

One option to achieve this is that a plurality of potential combinations of signals are defined, e.g., by a human engineer. The decision logic generator 20 may then run the supervised machine learning training for each combination. I.e., several raw signals are combined into the smaller set of ML model inputs in various ways and supervised machine learning is performed for each such combination. This may be done, e.g., by computing admittances or impedances from time-series data. Alternatively or additionally, wavelet transforms or filtering may be used to condense the raw signals into a smaller number of ML model inputs. The most appropriate combination of raw signals, i.e. one which achieves a good or optimum trade-off between protection performance and interpretability, may be selected.

The "feature selection" task (which relates to how the pre-processing module 42 operates) can be partially automated by means of a search algorithm which identifies the combinations of features (input signals) which achieve the best performance. A human engineer may optionally select which one of those combinations resulted in a more "interpretable" protection logic. To facilitate the selection of features by the human expert, a number of higher-ranked visualizations are provided to the human expert for selection.

Figure 24:
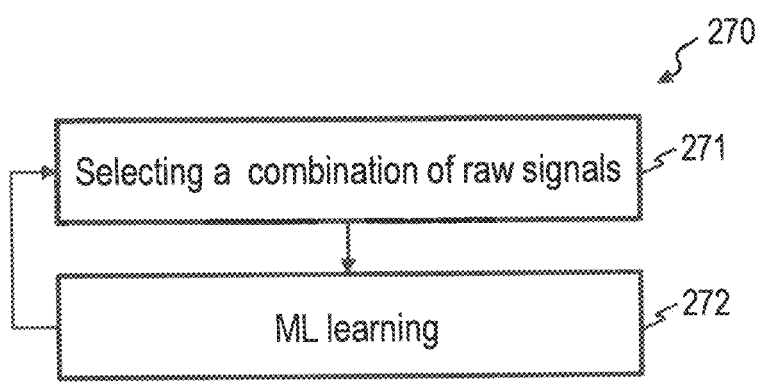

This is illustrated in FIG. 24, which is a flow chart of a method 270. The method 270 may be performed by the decision logic generator 20. At step 271, a search for optimum inputs (i.e., combination of raw signals) may be initiated. At step 272, machine learning is performed and the resultant trained ML model is stored for further evaluation. The method returns to step 271, where a different combination of raw signals is selected as inputs. Ultimately, the various decision logics are compared with regards to their performance and, preferably, their interpretability. Criteria such as expected behavior that reflects symmetries in the underlying electric power system (e.g., under cyclic permutation of the three phases) may be used to assess the trained ML model.

Yet another alternative is to train a model with a plurality of input features, and use some regularization or ANN pruning technique (such as L1 regularization or dropout) to limit the number of input features.

Various effects and advantages are attained by the methods and computer systems according to embodiments. For illustration, the decision logic can be generated automatically using machine learning (ML). In addition, the interpretation of the decision logic that results from the ML process by an expert engineer for, e.g., validation. This aids the decision on when and how a decision logic needs to be modified in response to a change in the power system (e.g., change in topology or change of one of the components).

While embodiments have been described in the context of protection relays, the methods and computer systems are not limited to generating and/or using the decision logic of a protection relay of a power generation, distribution, or transmission system. Rather, the disclosed methods and computer systems may be used to generate the decision logic of a controller or of several controllers of an IACS.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of generating a decision logic for a controller of an Industrial Automation Control System, IACS, in particular for a controller for power system protection or power system control, the method comprising:
   performing machine learning, ML, using labeled data to thereby train a ML model to generate the decision logic, wherein
      the ML model has ML model inputs and ML model outputs, and the ML model is decomposed by introducing one or more checkpoints into the ML model to divide the ML model into a plurality of computational sub-processes, wherein, at each checkpoint, intermediate signals output by one of the computational sub-processes are input into a subsequent one of the computational sub-processes, and wherein, at at least one checkpoint, a total number of the intermediate signals is equal to or less than three or when the total number of the intermediate signals is greater than three, the at least one integrated circuit is adapted to perform a projection of a decision boundary into a two-or three-dimensional space;

generating and outputting a visual representation of values of the intermediate signals of at least one of the computational sub-processes;

generating the decision logic for the controller using the ML model;

deploying the decision logic to the controller for execution; and executing, by the controller, the decision logic during operation of the power system.

2. The method of claim 1, further comprising:
controlling an optical output device to output the visual representation.

3. The method of claim 2, wherein the visual representation depends on at least one decision boundary or numerical function of the decision logic as a function of the intermediate signals.

4. The method of claim 2, wherein the decision logic is a classifier that determines which one of at least two different control actions is to be performed, and wherein the visual representation visualizes decision boundaries separating the control actions.

5. The method of claim 1, wherein the three or less intermediate signals are three or less real-valued scalars.

6. The method of claim 2, wherein the method further comprises performing a linear or nonlinear projection of a decision boundary into a two-or three-dimensional space, wherein the visual representation visualizes the projection of the decision boundary.

7. The method of claim 6, further comprising
selectively modifying the ML model, including removing and/or replacing at least part of a computational graph, and
repeating the supervised ML for the modified ML model.

8. The method of claim 1, wherein the ML is performed iteratively by learning in stages.

9. The method of claim 1, wherein the ML model receives plural sets of ML model inputs, wherein the method further comprises generating aggregated information from the plural sets of ML model inputs and using the aggregated information in combination with the intermediate signals to generate the visual representation.

10. The method of claim 9, wherein the plural sets of ML model inputs are grouped according to time or according to signal type.

11. The method of claim 9, wherein in dependence on a type of the decision logic, the plural sets of ML model inputs are grouped by signal type to provide the input of the ML model or grouped by time to provide the input of the ML model.

12. The method of claim 1, wherein the ML model includes at least one artificial neural network.

13. The method of claim 1, wherein the decision logic is a power system protection logic.

14. The method of claim 1, wherein the ML model outputs correspond to control actions for immediate trip, trip with delay, and restrain, and wherein the ML model inputs include at least one of the following:
3-phase admittances;
3-phase impedances;
phasors, including voltages and currents;
raw voltages and/or currents;
superimposed voltages and/or currents;
voltages and/or currents filtered using a digital filter;
alpha-beta transformed voltages and/or currents;
DQ-transformed voltages and/or currents;
Fourier transformed voltages and/or currents;
wavelet transformed voltages and/or currents.

15. The method of claim 1, wherein a first one of the plurality of computational sub-processes comprises a first artificial neural network, and wherein a second one of the plurality of computational sub-processes comprises a second artificial neural network that is different from the first artificial neural network.

16. The method of claim 1, wherein the decision logic is a decision logic for a digital protection relay.

17. A computer system for generating a decision logic for a controller of an Industrial Automation Control System, IACS, in particular for a controller for power system protection or power system control, the computer system comprising:
at least one integrated circuit adapted to:
perform machine learning, ML, using labeled data to thereby train a ML model to generate the decision logic, wherein
the ML model has ML model inputs and ML model outputs, and
the ML model is decomposed by introducing one or more checkpoints into the ML model to divide the ML model into a plurality of computational sub-processes, wherein, at each checkpoint, intermediate signals output by one of the computational sub-processes are input into a subsequent one of the computational sub-processes, and wherein, at at least one checkpoint, a total number of the intermediate signals is equal to or less than three or when the total number of the intermediate signals is greater than three, the at least one integrated circuit is adapted to perform a projection of a decision boundary into a two-or three-dimensional space;
generate and output a visual representation of values of the intermediate signals of at least one of the computational sub-processes;
generate the decision logic for the controller using the ML model; and
deploy the decision logic to at least one integrated circuit of the controller that is adapted to execute the decision logic during operation of the power system; and
an output interface adapted to output the visual representation.

18. An Industrial Automation Control System, IACS, in particular a power system, comprising:
a controller adapted to execute a decision logic to decide which one of a plurality control actions must be taken; and
a computer system for generating the decision logic, the computer system comprising:

at least one integrated circuit adapted to:
  perform machine learning, ML, using labeled data to thereby train a ML model to generate the decision logic, wherein
    the ML model has ML model inputs and ML model outputs, and
    the ML model is decomposed by introducing one or more checkpoints into the ML model to divide the ML model into a plurality of computational sub-processes, wherein, at each checkpoint, intermediate signals output by one of the computational sub-processes are input into a subsequent one of the computational sub-processes, and wherein, at at least one checkpoint, a total number of the intermediate signals is equal to or less than three or when the total number of the intermediate signals is greater than three, the at least one integrated circuit is adapted to perform a projection of a decision boundary into a two-or three-dimensional space;
  generate and output a visual representation of values of the intermediate signals of at least one of the computational sub-processes;
  generate the decision logic for the controller using the ML model; and
  deploy the decision logic to the controller; and
an output interface adapted to output the visual representation.

* * * * *